(12) United States Patent
Ollila et al.

(10) Patent No.: US 12,432,464 B2
(45) Date of Patent: Sep. 30, 2025

(54) ADJUSTABLE COLOUR FILTER ARRAY USING LIQUID CRYSTAL DEVICE

(71) Applicant: Varjo Technologies Oy, Helsinki (FI)

(72) Inventors: Mikko Ollila, Tampere (FI); Mikko Strandborg, Hangonkylä (FI)

(73) Assignee: Varjo Technologies Oy, Helsinki (FI)

( * ) Notice: Subject to any disclaimer, the term of this patent is extended or adjusted under 35 U.S.C. 154(b) by 164 days.

(21) Appl. No.: 18/541,183

(22) Filed: Dec. 15, 2023

(65) Prior Publication Data

US 2025/0203229 A1    Jun. 19, 2025

(51) Int. Cl.
  *H04N 25/13*  (2023.01)
  *G02B 5/20*  (2006.01)
  *G02F 1/137*  (2006.01)
  *H04N 23/611*  (2023.01)
  *H04N 23/71*  (2023.01)

(52) U.S. Cl.
  CPC ........... *H04N 25/135* (2023.01); *G02B 5/201* (2013.01); *G02F 1/137* (2013.01); *H04N 23/611* (2023.01); *H04N 23/71* (2023.01)

(58) Field of Classification Search
  CPC .... H04N 25/135; H04N 23/611; H04N 23/71; G02B 5/201; G02F 1/137
  USPC ........................................................ 348/302
  See application file for complete search history.

(56) References Cited

U.S. PATENT DOCUMENTS

| | | | |
|---|---|---|---|
| 7,782,490 B2 * | 8/2010 | Mestha | H04N 1/603 358/1.9 |
| 2007/0140189 A1 * | 6/2007 | Muhamed | H04W 48/14 370/338 |
| 2017/0140221 A1 * | 5/2017 | Ollila | G06V 40/19 |
| 2021/0248969 A1 * | 8/2021 | Strandborg | G09G 3/3611 |

* cited by examiner

*Primary Examiner* — Usman A Khan
(74) *Attorney, Agent, or Firm* — ZIEGLER IP LAW GROUP, LLC.

(57) ABSTRACT

Disclosed is imaging system with an image sensor having photo-sensitive cells arranged on photo-sensitive surface of image sensor; colour filter array (CFA) arranged on optical path of photo-sensitive surface, CFA with: first, second, third and fourth types of colour filters that allow wavelengths lying in first, second, third wavelength ranges, respectively, to pass through; and light valve device having grid of light valves, wherein light valves of grid are arranged on optical paths of at least fourth type of colour filters; and processor(s) configured to: for given colour filter of fourth type, control corresponding light valve during given time period to allow wavelengths lying in first, second, or third wavelength range, to pass through towards given colour filter; read out image data from photo-sensitive cells; and process image data to generate given image.

15 Claims, 4 Drawing Sheets

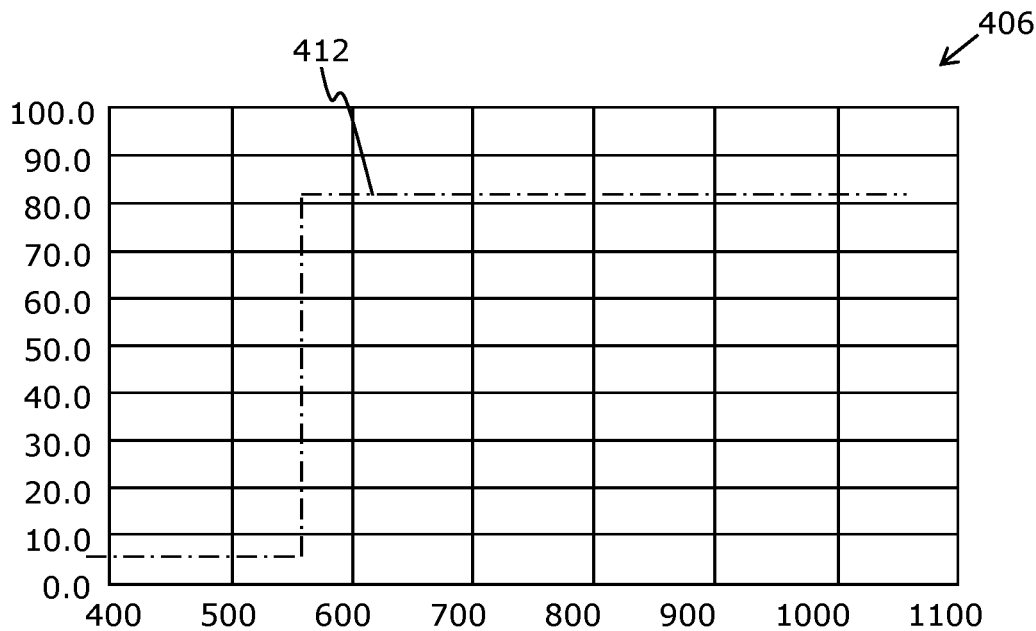
FIG. 4C
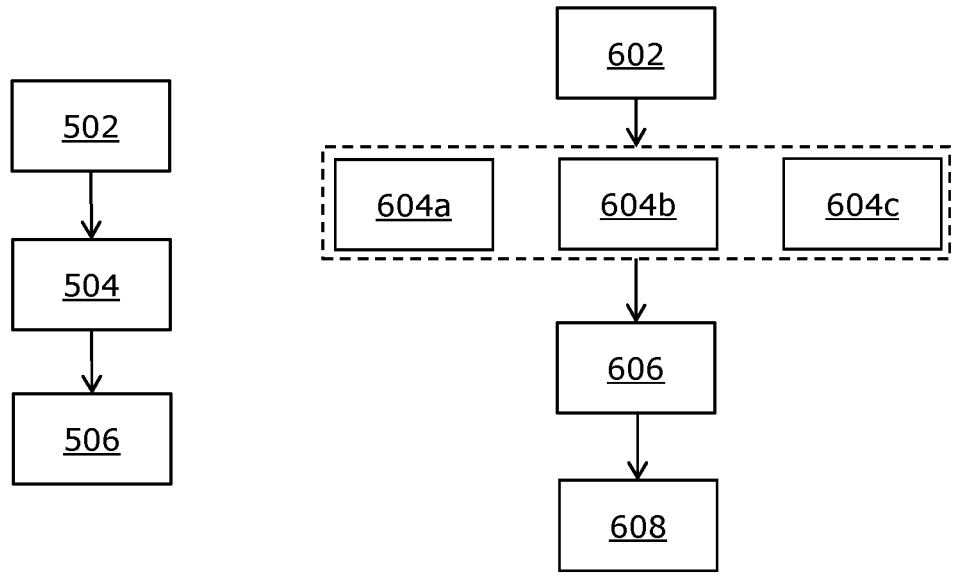
FIG. 5
FIG. 6

ADJUSTABLE COLOUR FILTER ARRAY USING LIQUID CRYSTAL DEVICE

TECHNICAL FIELD

The present disclosure relates to imaging systems incorporating adjustable colour filter arrays using light valve devices. The present disclosure also relates to methods incorporating adjustable colour filter arrays using light valve devices.

BACKGROUND

Nowadays, with an increase in the number of images being captured every day, there is an increased demand for developments in image processing. Such a demand is quite high and critical in case of evolving technologies such as immersive extended-reality (XR) technologies which are being employed in various fields such as entertainment, real estate, training, medical imaging operations, simulators, navigation, and the like. Several advancements are being made to develop image generation technology.

However, existing image generation technology has several limitations associated therewith. The existing image generation technology use conventional colour filter arrays that are arranged on top of surfaces of image sensor, wherein the conventional colour filter arrays are typically in fixed patterns. Herein, a common pattern is Bayer pattern, wherein a smallest repeating unit comprises two green colour filters, one blue colour filter, and a red colour filter, arranged in a 2×2 matrix in a repeating manner. There are also other colour patterns, for example quad, 9C and 16C patterns, where within a group of 2×2, 3×3 or 4×4 the same colour pattern repeats itself in the Bayer pattern. Moreover, many other patterns exist and also patterns where there are more than 3 colours and sometimes one of the green pixels is replaced by a white pixel. Such colour filters are formed by depositing transparent materials that only transmit a portion of visible spectrum, therefore making it possible for the image sensor to detect different colours. Ideally, the colour pattern in an environment that provides best performance is utilized. For example, a Red-Green-Blue-White (RGBW)-based colour pattern is utilised when the environment is noisy, and the Bayer pattern is utilised when accurate colour reproduction is required. In this regard, a spatial variation is required to distinguish between the different colours. Moreover, existing image generation technology are mostly well-suited for accurately generating a gaze region of an image, and often fails to accurately generate a peripheral region of the image, for example, with a low noise. This highly adversely affects an overall visual quality of generated images, thereby leading to an unrealistic, non-immersive viewing experience for the user. Moreover, the existing image generation technology are mostly well-suited for spatial tracking and segmentation of certain distinct object of a particular colour only.

Referring to FIG. 1A (Prior Art), there is illustrated an exemplary graphical representation 100 of colour responses when a colour filter array utilises the Bayer colour pattern. In FIG. 1A, the graphical representation 100 depicts a response of a blue colour filter, a green colour filter and a red colour filter. The horizontal axis represents wavelengths of colours in nanometres (nm), and the vertical axis represents the response in a form of efficiency in percent. In FIG. 1A, the response of the blue colour filter is shown by line 104, the response of the green colour filter is shown by line 106, and the response of the red colour filter is shown by line 108. The response of the red colour filter has a peak value within a wavelength range 580 nm to 600 nm, the response of the green colour filter has a peak value within a wavelength range 500 nm to 540 nm, and the response of the blue colour filter has a peak value within a wavelength range 450 nm to 460 nm. However, it is evident that in reality, the responses of all the colour filters extend beyond their expected range and lie within a wavelength range of 400 nm to 1100 nm. Hence, the colour responses are not well-defined, therefore making the colours indistinguishable when images are captured using such colour filters.

In FIG. 1B (Prior Art), there is illustrated another exemplary graphical representation 102 of colour responses for a white colour filter. The graphical representation 102 depicts a response of a white colour filter with line 110. It is evident that, the response of the white colour filter extends beyond its expected range and lies within the wavelength range of 400 nm to 1100 nm. Hence, white pixel response is also not well-defined.

Therefore, in light of the foregoing discussion, there exists a need to overcome the aforementioned drawbacks.

SUMMARY

The aim of the present disclosure is to provide imaging systems and methods incorporating adjustable colour filter arrays using light valve devices, to facilitate accurate distinguishing of colours to generate a high-quality image in a time-effective manner, by controlling the light valves in a dynamic manner. The aim of the present disclosure is achieved by imaging systems and methods which incorporate adjustable colour filter arrays using light valve devices as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIGS. 4A, 4B, and 4C illustrate exemplary graphical implementations of colour responses when the imaging system of FIG. 2 is in use, in accordance with an embodiment of the present disclosure;

FIG. 5 illustrates steps of a method incorporating adjustable colour filter array using light valve devices, in accordance with an embodiment according to the aforementioned first and second aspects of the present disclosure; and FIG. 6 illustrates steps of a method incorporating adjustable colour filter array using light valve devices, in accordance with another embodiment according to the aforementioned third and fourth aspects of the present disclosure.

DETAILED DESCRIPTION OF EMBODIMENTS

Figure 1A:
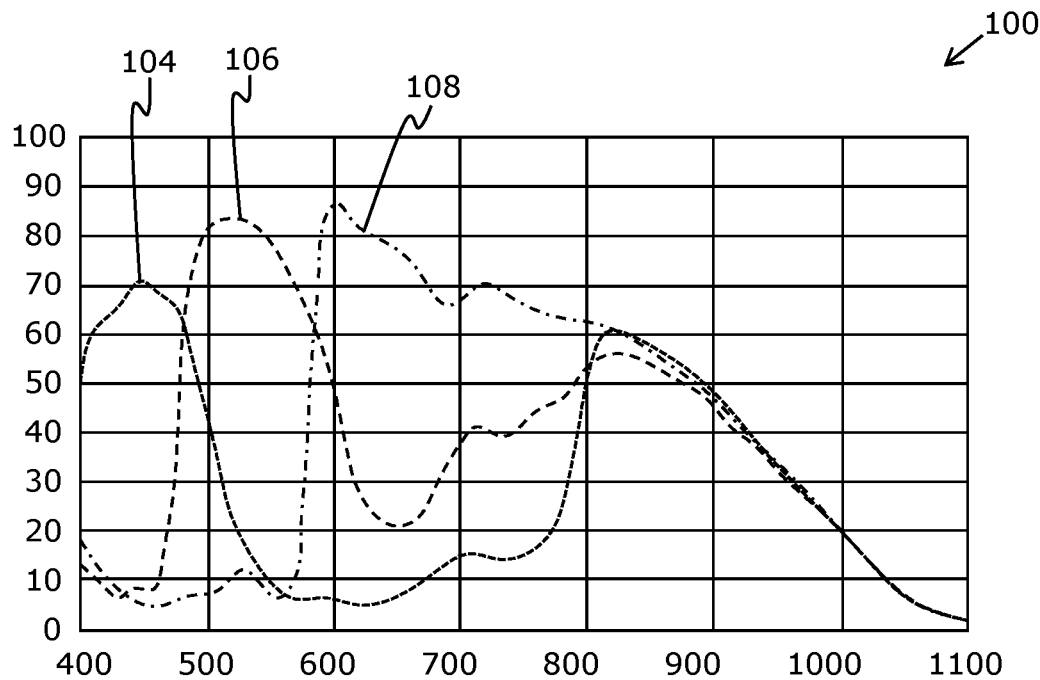
FIG. 1A (Prior Art) and FIG. 1B (Prior Art) illustrates exemplary graphical representations of colour responses when a colour filter array utilises the Bayer colour pattern.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides an imaging system comprising:

an image sensor comprising:
- a plurality of photo-sensitive cells arranged on a photo-sensitive surface of the image sensor;
- a colour filter array arranged on an optical path of the photo-sensitive surface of the image sensor, the colour filter array comprising:
  - a first type of colour filters that allow wavelengths lying in a first wavelength range to pass through;
  - a second type of colour filters that allow wavelengths lying in a second wavelength range to pass through;
  - a third type of colour filters that allow wavelengths lying in a third wavelength range to pass through; and
  - a fourth type of colour filters that allow wavelengths lying in the first wavelength range, the second wavelength range and the third wavelength range to pass through; and
- a light valve device comprising a grid of light valves, wherein the light valves of said grid are arranged on optical paths of at least the fourth type of colour filters; and at least one processor configured to:
- for a given colour filter of the fourth type, control a corresponding light valve during a given time period to allow wavelengths lying in only one of: the first wavelength range, the second wavelength range, the third wavelength range, to pass through towards the given colour filter of the fourth type, wherein the given colour filter of the fourth type allows said wavelengths to pass therethrough towards a corresponding photo-sensitive cell;
- read out image data from the plurality of photo-sensitive cells; and
- process the image data to generate a given image.

In a second aspect, the present disclosure provides a method implemented by an imaging system comprising an image sensor comprising:

a plurality of photo-sensitive cells arranged on a photo-sensitive surface of the image sensor;
a colour filter array arranged on an optical path of the photo-sensitive surface of the image sensor, the colour filter array comprising:
- a first type of colour filters that allow wavelengths lying in a first wavelength range to pass through;
- a second type of colour filters that allow wavelengths lying in a second wavelength range to pass through;
- a third type of colour filters that allow wavelengths lying in a third wavelength range to pass through; and
- a fourth type of colour filters that allow wavelengths lying in the first wavelength range, the second wavelength range and the third wavelength range to pass through; and
- a light valve device comprising a grid of light valves, wherein the light valves of said grid are arranged on optical paths of at least the fourth type of colour filters; and the method comprising:
- for a given colour filter of the fourth type, controlling a corresponding light valve during a given time period to allow wavelengths lying in only one of: the first wavelength range, the second wavelength range, the third wavelength range, to pass through towards the given colour filter of the fourth type, wherein the given colour filter of the fourth type allows said wavelengths to pass therethrough towards a corresponding photo-sensitive cell;
- reading out image data from the plurality of photo-sensitive cells; and
- processing the image data to generate a given image.

The present disclosure provides the aforementioned first aspect and the aforementioned second aspect to generate high-quality and realistic images, by utilising the colour filters of the fourth type to allow the wavelengths lying in only one of: the first wavelength range, the second wavelength range, the third wavelength range, instead of all the wavelength ranges, to pass through towards their corresponding photo-sensitive cells. Herein, said wavelengths are filtered using the corresponding light valve, wherein the corresponding light valve allows only wavelengths that lie in only one of: the first wavelength range, the second wavelength range, the third wavelength range, and blocks other wavelengths. This allows the colour filters of the fourth type to be utilised for different wavelength ranges at different time instants. Beneficially, upon processing the image data, a high visual quality (for example, in terms of a native resolution, a high contrast, a realistic and accurate colour reproduction, and the like) is achieved in the given image, as well as low noise is achieved. This considerably improves a viewing experience of a user (for example, in terms of realism and immersiveness), when the given image is displayed to the user. The aforementioned first aspect and the second aspect also reduces a processing time and processing resources of the at least one processor. This potentially makes the imaging system suitable for use with demanding applications (such as extended-reality applications). The method and the imaging system are simple, robust, fast, reliable, and can be implemented with ease. Throughout the present disclosure, the term "imaging system" refers to an apparatus for imaging a real-world environment. The imaging system may be used for imaging real-world environments for a variety of applications including, but not limited to, extended-reality (XR), inspection of the real-world environment, machine vision, gaming, art, and so forth.

Throughout the present disclosure, the term "image sensor" refers to a device that detects light from the real-word environment at its photo-sensitive surface, thereby enabling the plurality of photo-sensitive cells arranged on the photo-sensitive surface to capture a plurality of image signals. The plurality of image signals are electrical signals (namely, current signals and/or voltage signals) pertaining to a real-world scene of the real-world environment. The plurality of image signals constitute the image data of the plurality of photo-sensitive cells. Herein, the term "image data" refers to information pertaining to a given photo-sensitive cell of the image sensor, wherein said information comprises one or more of: a colour value, a depth value, a transparency value, a luminosity value, an intensity value, of the given photo-sensitive cell. The colour value could, for example, be Red-Green-Blue (RGB) values, Red-Green-Blue-Alpha (RGB-A) values, Cyan-Magenta-Yellow-Black (CMYK) values, Red-Green-Blue-Depth (RGB-D) values, or similar. Examples of the image sensor include, but are not limited to, a charge-coupled device (CCD) image sensor, and a complementary metal-oxide-semiconductor (CMOS) image sensor. Such image sensors are well-known in the art.

It will be appreciated that the plurality of photo-sensitive cells could, for example, be arranged in a rectangular two-dimensional (2D) grid, a polygonal arrangement, a circular arrangement, an elliptical arrangement, a freeform arrangement, or the like, on the image sensor. In an example, the image sensor may comprise 25 megapixels arranged in the rectangular 2D grid (such as a 5000×5000 grid) on the photo-sensitive surface.

Optionally, the image sensor is a part of a camera that is employed to capture image(s). Optionally, the camera is implemented as a visible-light camera. Examples of the visible-light camera include, but are not limited to, a Red-Green-Blue (RGB) camera, a Red-Green-Blue-Alpha (RGB-A) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera.

Throughout the present disclosure, the term "colour filter array" refers to a pattern of colour filters arranged in front of the plurality of photo-sensitive cells of the photo-sensitive surface, wherein the colour filter array (CFA) allows only specific wavelengths of light to pass through a given colour filter to reach a corresponding photo-sensitive cell of the photo-sensitive surface, for capturing corresponding image data. The CFA could be a Bayer CFA, a non-Bayer CFA, or similar. The CFA is well-known in the art.

Notably, there are at least four different types of colour filters in the CFA, as discussed earlier. In an example, for a Red-Green-Blue-White (RGBW)-based implementation, the first type of colour filters may be a blue-type of colour filters, the second type of colour filters may be a green-type of colour filters, the third type of colour filters may be a red-type of colour filters, and the fourth type of colour filters may be a white-type of colour filters. In this regard, the first wavelength range (that corresponds to the blue-type of colour filters) may be from 400 nanometres (nm) to 480 nm, the second wavelength range (that corresponds to the green-type of colour filters) may be from 480 nm to 580 nm, the third wavelength range (that corresponds to the red-type of colour filters) may be from 580 nm to 700 nm. It is to be understood that the fourth type of colour filters defines a white or near white filter, which allows most of the wavelengths lying in a wavelength range of 400 nm to 700 nm. The aforesaid wavelength ranges may also overlap with each other.

In another example, for a Cyan-Magenta-Yellow-White (CMYW)-based implementation, the first type of colour filters may be a cyan-type of colour filters, the second type of colour filters may be a magenta-type of colour filters, the third type of colour filters may be a yellow-type of colour filters, and the fourth type of colour filters may be a white-type of colour filters. In this regard, the first wavelength range (that corresponds to the cyan-type of colour filters) may be from 490 nm to 520 nm, the second wavelength range (that corresponds to the magenta-type of colour filters) may be from 600 nm to 660 nm, the third wavelength range (that corresponds to the yellow-type of colour filters) may be from 570 nm to 590 nm. It is to be understood that the fourth type of colour filters defines a white or a near-white filter, which allows most of the wavelengths lying in a wavelength range of 490 nm to 660 nm. The aforesaid wavelength ranges may also overlap with each other.

Throughout the present disclosure, the term "light valve device" refers to a device that is dynamically controllable to allow to pass through a specific wavelength range, while blocking other wavelength ranges. Herein, the light valve device is used to control an amount of the light to be incident on the photo-sensitive surface of the image sensor. Such controlling of the amount of light is performed by the light valve device by any one of: deflecting the light to be incident on the photo-sensitive surface, blocking the light. An example of the light valve device is a liquid crystal light valve device. Herein, the liquid crystal light valve device comprises a liquid crystal layer. This liquid crystal layer is implemented as a switching polarising filter, wherein the electrical signals are applied to voltage control the amount of light incident on the photo-sensitive surface of the image sensor, in a switching manner. Optionally, the light valve device used is a liquid crystal panel.

The light valve device comprises the grid of light valves, wherein the term "grid" refers to a structured arrangement of the light valves. Such arrangement could be in rows and columns, forming the grid. Moreover, the grid can be a continuous grid or a discontinuous grid. In a first implementation, the grid of light valves covers only a part of the colour filter array. In a second implementation, the grid of light valves covers the colour filter array in its entirety. Moreover, the light valves of the grid are arranged in such a manner that the light to be incident on the photo-sensitive surface of the image sensor, passes through at least the fourth type of colour filter. A given light valve is controlled to adjust an exposure of the image sensor by controlling a time of exposure of the image sensor. In this regard, when the given light valve is fully open (i.e., when the light valve device is switched OFF), light is incident on the image sensor, which results in a bright exposure (for example, such as when capturing images during daytime). Alternatively, when the given light valve is partially closed (i.e., when the light valve device is switched ON), less light is incident on the image sensor, which results in a dark exposure (for example, such as when capturing images during night-time).

Notably, the at least one processor controls an overall operation of the imaging system. It will be appreciated that the at least one processor is communicably coupled to the image sensor and the light valve device. The at least one processor could be implemented as any one of: an image signal processor, a microprocessor, a microcontroller, or a controller. As an example, the image signal processor may be a programmable digital signal processor (DSP). As another example, the at least one processor could be implemented as an application-specific integrated circuit (ASIC) chip or a reduced instruction set computer (RISC) chip.

It will be appreciated that the phrase "a given colour filter" encompasses a single colour filter of a given colour and/or a plurality of colour filters having different shades of a given colour. In particular, "a given colour filter of a given type" encompasses a single colour filter of the given type and/or a plurality of colour filters having different shades of the given type. Herein, in the aforementioned phrase "a given colour filter of a given type", the term "a given type" encompasses a given colour filter of the first type, a given colour filter of the second type, a given colour filter of the third type, and/or a given colour filter of the fourth type. For example, in a case where the first type of colour filters are colour filters of a blue colour, there could be different shades of the blue colour in different colour filters of the first type. Likewise, in a case where the second type of colour filters are colour filters of a green colour, there could be different shades of the green colour in different colour filters of the second type. Similarly, in a case where the third type of colour filters are colour filters of a red colour, there could be different shades of the red colour in different colour filters of the third type. Moreover, the fourth type of colour filters define a white or near white filter, which allows most of the wavelengths lying in a wavelength range of 400 nanometres to 700 nanometres to pass through. It will also be appreciated that the fourth type of colour filters allow passing of the first wavelength, the second wavelength and the third wavelength therethrough simultaneously.

The at least one processor is configured to employ the given colour filter of the fourth type to read specific wavelengths i.e., the wavelengths that lie only in one of: the first wavelength range, the second wavelength range, the third wavelength range, during the given time period. Herein, the "given time period" includes an exposure time period for which corresponding photo-sensitive cell is to be exposed, in order to accumulate charge. A unit of measurement of the given time period may be seconds, milliseconds, nanoseconds, and similar.

In this regard, the at least one processor is configured to switch ON the corresponding light valves, in order to control an opening and closing of the corresponding light valves to allow only the specific wavelengths to pass through, and facilitates a passage of the specific wavelengths towards the given colour filter of the fourth type. Hence, a response of the given colour filter of the fourth type changes accordingly, and the given colour filter allows the light having the wavelength lying in only one of the: the first wavelength range, the second wavelength range, the third wavelength range, to be incident on the corresponding photo-sensitive cells. This facilitates in precisely controlling the wavelengths that reaches the corresponding photo-sensitive cells of the image sensor, to maintain colour accuracy and fidelity, when the imaging system is in operation. Beneficially, an interference or noise can be reduced in the image captured when the imaging system is in operation, by filtering out unwanted wavelengths which lie outside of any one of: the first wavelength range, the second wavelength range, the third wavelength range.

The image data is read out by the at least one processor from the image sensor. Herein, the at least one processor is configured to read out the image data in a line-by-line (namely, sequential) manner. The image data is read out to retrieve at least the colour value and the intensity value of the corresponding photo-sensitive cells, to enable the at least one processor to process the image data to generate the image.

Upon reading out the image data, the at least one processor is configured to process the image data to generate the given image. Herein, the term "image" refers to a visual representation of the real-world environment. The term "visual representation" encompasses colour information represented in the given image, and additionally optionally other attributes associated with the given image (for example, such as depth information, luminance information, transparency information (namely, alpha values), polarization information, and the like). Optionally, when processing the image data, the at least one processor is configured to perform demosaicking and optionally, other image signal processing (ISP) on the image data (for example, in an ISP pipeline) to generate the given image. It will be appreciated that the at least one processor is configured to employ at least one image processing algorithm for performing the demosaicking. In this regard, the at least one image processing algorithm is a modified version of image processing algorithms that are well-known in the art for performing the demosaicking. The at least one image processing algorithm may also comprise at least one of: an image denoising algorithm, an interpolation algorithm, an image sharpening algorithm, a colour conversion algorithm, an auto white balancing algorithm, a deblurring algorithm, a contrast enhancement algorithm, a low-light enhancement algorithm, a tone mapping algorithm, a super-resolution algorithm, an image compression algorithm. Techniques for processing the image data for generating images are well-known in the art.

Optionally, the light valves of the grid are also arranged on optical paths of the first type of colour filters, the second type of colour filters and the third type of colour filters, wherein the at least one processor is configured to:
  for a given colour filter of the first type, control a corresponding light valve during the given time period to allow wavelengths lying in a first valve-based wavelength range to pass through towards the given colour filter of the first type, wherein the given colour filter of the first type allows wavelengths lying in a first wavelength sub-range to pass therethrough towards a corresponding photo-sensitive cell, wherein the first wavelength sub-range corresponds to an overlap between the first valve-based wavelength range and the first wavelength range;
  for a given colour filter of the second type, control a corresponding light valve during the given time period to allow wavelengths lying in a second valve-based wavelength range to pass through towards the given colour filter of the second type, wherein the given colour filter of the second type allows wavelengths lying in a second wavelength sub-range to pass therethrough towards a corresponding photo-sensitive cell, wherein the second wavelength sub-range corresponds to an overlap between the second valve-based wavelength range and the second wavelength range; and
  for a given colour filter of the third type, control a corresponding light valve during the given time period to allow wavelengths lying in a third valve-based wavelength range to pass through towards the given colour filter of the third type, wherein the given colour filter of the third type allows wavelengths lying in a third wavelength sub-range to pass therethrough towards a corresponding photo-sensitive cell, wherein the third wavelength sub-range corresponds to an overlap between the third valve-based wavelength range and the third wavelength range.

In this regard, a colour filter of a given type allows only its corresponding wavelengths to pass through, while blocking other wavelengths. Hence, the at least one processor is configured to control the light to be incident on the corresponding photo-sensitive cells by aligning the light valves along different optical paths associated with each type of colour filters. A technical effect of configuring the at least one processor in such a manner is that a broad range of colours can be generated by combining and controlling a transmission of particular wavelengths of light through the light valves and their corresponding colour filters.

Herein, the corresponding light valve is controlled by configuring the at least one processor during the given time period, wherein the given time period is used for generating the given image, as described in detail above. The wavelengths lying within a given light valve-based wavelength range then passes through the corresponding light valves towards the given colour filter of the given type. Thereafter, the given colour filter of the given type further narrows the wavelengths that can pass through towards the corresponding photo-sensitive cell, by allowing only those wavelengths lying in the given light valve-based wavelength range, that overlap with a given wavelength range of the given colour filter. Such overlap is defined by a given wavelength sub-range. Herein, the term "given light valve-based wavelength range" encompasses namely the first valve-based wavelength range, the second valve-based wavelength range, and/or the third valve-based wavelength range. The term "given wavelength range" encompasses namely the first wavelength range, the second wavelength range, and the third wavelength range. The term "given wavelength sub-range" encompasses namely the first wavelength sub-range, the second wavelength sub-range, and the third wavelength sub-range.

In other words, the wavelengths lying in the given wavelength sub-range allowed by the given colour filter of the given type, aligns with the overlap between the given light valve-based wavelength range controlled by the light valves and the given wavelength range. Hence, the given light valve-based wavelength range and the given wavelength range defined for the given colour filter of the given type at least partially coincide, allowing for particular wavelengths of light controlled by the corresponding light valves to be consistent with the wavelengths that falls within the given wavelength range. In an instance, the given light-valve based wavelength range (namely, a spectral response) of the corresponding light valves could be wider than the given wavelength range of the given colour filter of the given type. In another instance, the given light-valve based wavelength range of the corresponding light valves could be narrower than given wavelength range of the given colour filter of the given type. In both such instances, only wavelengths lying in the given wavelength sub-range, i.e., the overlapping wavelengths between the given light-valve based wavelength range and the given wavelength range, will pass through towards the corresponding photo-sensitive cell.

As a first example, the colour filter array comprises a first type of colour filter that may allow wavelengths lying in a first wavelength range (that corresponds to the blue-type of colour filters). The first wavelength range may be from 400 nm to 430 nm. During the given time period, a corresponding light valve may allow wavelengths lying in a first light valve-based wavelength range to pass through towards the given colour filter of the first type. The first light valve-based wavelength range may be from 300 nm to 440 nm. The first wavelength sub-range may be from 400 nm to 430 nm, which corresponds to an overlap between the first light valve-based wavelength range and the first wavelength range. Thus, the first type of colour filter may allow wavelengths that lie in the first wavelength sub-range to pass therethrough towards a corresponding photo-sensitive cell.

Optionally, the at least one processor is configured to:
for the given colour filter of the first type, control the corresponding light valve during another time period to allow wavelengths lying in another first valve-based wavelength range to pass through towards the given colour filter of the first type, wherein the given colour filter of the first type allows wavelengths lying in another first wavelength sub-range to pass therethrough towards the corresponding photo-sensitive cell, wherein the another first wavelength sub-range corresponds to an overlap between the another first valve-based wavelength range and the first wavelength range, and is different from the first wavelength sub-range;
for the given colour filter of the second type, control the corresponding light valve during the another time period to allow wavelengths lying in another second valve-based wavelength range to pass through towards the given colour filter of the second type, wherein the given colour filter of the second type allows wavelengths lying in another second wavelength sub-range to pass therethrough towards the corresponding photo-sensitive cell, wherein the another second wavelength sub-range corresponds to an overlap between the another second valve-based wavelength range and the second wavelength range, and is different from the second wavelength sub-range;
for the given colour filter of the third type, control the corresponding light valve during the another time period to allow wavelengths lying in another third valve-based wavelength range to pass through towards the given colour filter of the third type, wherein the given colour filter of the third type allows wavelengths lying in another third wavelength sub-range to pass therethrough towards the corresponding photo-sensitive cell, wherein the another third wavelength sub-range corresponds to an overlap between the another third valve-based wavelength range and the third wavelength range, and is different from the third wavelength sub-range; and
for the given colour filter of the fourth type, control the corresponding light valve during the another time period to allow wavelengths lying in only one of: the first wavelength range, the second wavelength range, the third wavelength range, the first wavelength sub-range, the second wavelength sub-range, the third wavelength sub-range, to pass through towards the given colour filter of the fourth type, wherein the given colour filter of the fourth type allows said wavelengths to pass therethrough towards the corresponding photo-sensitive cell;
read out another image data from the plurality of photo-sensitive cells; and
process the another image data to generate another image.

In this regard, the at least one processor is configured to generate the another image, namely different from the given image as mentioned above. This another image is generated during the another time period, namely different from the given time period, as mentioned above. A technical effect of generating the another image in such a manner is that it creates a notable difference from the given image, so that the difference in colours in the two images (namely, the given image and the another given image) can be interpolated. This enables the at least one processor to provide a final image which captures intensities of all wavelengths, i.e., a spectral image.

Herein, the corresponding light valve is controlled by configuring the at least one processor during the another time period, wherein the another time period is used for generating the another image. The wavelengths lying within another given light valve-based wavelength range then passes through the corresponding light valves towards the given colour filter of the given type. Thereafter, the given colour filter of the given type further narrows the wavelengths that can pass through towards the corresponding photo-sensitive cell, by allowing only those wavelengths lying in the another given light valve-based wavelength range, that overlap with the given wavelength range of the colour filter array. Such overlap is defined by another given wavelength sub-range. Herein, the term "another given light valve-based wavelength range" encompasses namely the another first valve-based wavelength range, the another second valve-based wavelength range, and/or the another third valve-based wavelength range. The term "another given wavelength sub-range" encompasses namely the another first wavelength sub-range, the another second wavelength sub-range, and the another third wavelength sub-range. Moreover, the wavelengths lying within the another given light valve-based wavelength range could overlap with the wavelengths lying in the given light valve-based wavelength range. As mentioned, the another given wavelength sub-range is different from the given wavelength sub-range, but may overlap with the given wavelength sub-range.

In other words, the wavelengths lying in the another given wavelength sub-range allowed by the given colour filter of the given type, aligns with the overlap between the another given light valve-based wavelength range controlled by the light valves and the given wavelength range. Hence, the another given light valve-based wavelength range and the given wavelength range defined for the given colour filter of the given type partially coincide, allowing for particular wavelengths of light controlled by the corresponding light valves to be consistent with the wavelengths that falls within the given wavelength range. In an instance, the another given light-valve based wavelength range of the corresponding light valves could be wider than the given wavelength range of the given colour filter of the given type. In another instance, the another given light-valve based wavelength range of the corresponding light valves could be narrower than given wavelength range of the given colour filter of the given type. In both such instances, only wavelengths lying in the another given wavelength sub-range, i.e., the overlapping wavelengths between the another given light-valve based wavelength range and the given wavelength range, will pass through towards the corresponding photo-sensitive cell.

Notably, when the given colour filter is of the fourth type, the corresponding light valves allows wavelengths lying in only one of: the first wavelength range, the second wavelength range, the third wavelength range, the first wavelength sub-range, the second wavelength sub-range, the third wavelength sub-range.

Subsequently, the another image data is read out by the at least one processor from the image sensor, similar to the manner of reading out the image data by the at least one processor, as described in detail earlier. Upon reading out the another image data, the at least one processor is configured to process the another image data to generate the another image. This processing of the another image data by the at least one processor is performed in a manner similar to the processing of the image data to generate the given image, as described in detail earlier.

Continuing in reference with the first example, during the another time period, a corresponding light valve may allow wavelengths lying in another first light valve-based wavelength range to pass through towards the given colour filter of the first type. The another first light valve-based wavelength range may be from 420 nm to 550 nm. The another first wavelength sub-range may be from 420 nm to 430 nm, which corresponds to an overlap between the another first light valve-based wavelength range and the first wavelength range. Thus, the given colour filter of the first type allow wavelengths that lie in the another first wavelength sub-range to pass therethrough towards a corresponding photo-sensitive cell.

Optionally, the at least one processor is configured to generate the spectral image from the given image and the another image. Herein, the term "spectral image" refers to a merged image that is generated by capturing information (i.e., the image data and the another image data) across different ranges of wavelengths within an electromagnetic spectrum. Hence, the spectral image comprises information regarding a distribution of light intensity at particular wavelengths. A technical effect of generating the spectral image is that it facilitates generation of insights into spectral signatures of various objects (as represented in the image and the another image) present in the real-world environment, wherein such spectral signatures are unique for every object. In this regard, optionally, the at least one processor is further configured to employ image processing techniques to combine the image data of the given image and the another image data of the another image. The image processing techniques could be at least one of: mathematical operations, spectral data transformations, spectral data-based algorithms. Examples of such image processing techniques may include, but are not limited to, hyperspectral imaging technique, multispectral imaging technique, and grafting-based technique. Such image processing techniques are well-known in the art.

Optionally, the spectral image can be generated from more than two images.

Optionally, the at least one processor is configured to:
  detect when a given criteria is satisfied, wherein the given criteria is satisfied when at least one of the following is true:
    (i) an average illuminance of a real-world environment is lower than a predefined threshold illuminance;
    (ii) a signal-to-noise ratio of the image data is lower than a predefined threshold value;
  when it is detected that the given criteria is satisfied,
    for at least a predefined percent of the colour filters of the fourth type, control their corresponding light valves during yet another time period to allow the wavelengths lying in the first wavelength range, the second wavelength range and the third wavelength range to pass through towards at least the predefined percent of the colour filters of the fourth type, wherein at least the predefined percent of the colour filters of the fourth type allow said wavelengths to pass therethrough towards their corresponding photo-sensitive cells;
    read out yet another image data from the plurality of photo-sensitive cells; and
    process the yet another image data to generate yet another image.

In this regard, the at least one processor is configured to determine the average illuminance of the real-world environment, optionally, by employing at least one ambient light sensor. Typically, the at least one ambient light sensor is employed to measure an amount of light present in their surroundings. The ambient light sensors are well-known in the art. Alternatively, optionally, the at least one processor is configured to determine the average illuminance of the real-world environment by calculating an average of illuminance values of pixels in at least one previous image that is captured using the image sensor. Herein, the term "average illuminance" of the real-world environment refers to an average amount of light intensity per unit area in the real-world environment. In other words, the average illuminance is an average brightness level across an area within the real-world environment, taking into account variations in light intensities across said area. It will be appreciated that the predefined threshold illuminance refers to a minimum allowable illuminance of the real-world environment, below which the environment conditions of the real-world environment are considered to be low-light/dark environment conditions. Optionally, the predefined threshold illuminance lies in a range of 50 lux to 1500 lux. The predefined threshold illuminance lies in a range of 50, 100, 200, 400, 700, or 1200 lux to 350, 850, 1150, 1350, 1450, or 1500 lux.

Furthermore, optionally, the at least one processor is configured to determine the signal-to-noise ratio of the plurality of image signals by taking into account at least one of: illuminance values of pixels in at least one previous image that is captured using the image sensor, a quality of optics (for example, such as lens, mirrors, and the like) used in a camera comprising the image sensor, an exposure time of the image sensor, a sensitivity of the image sensor, an aperture size of the image sensor, a gain condition, optical aberrations, an operating temperature of the image sensor. As mentioned above, the plurality of image signals constitute the image data. In an example, the signal-to-noise ratio of the image data could be determined using a pre-defined correlation between the signal-to-noise ratio and at least one of the aforementioned factors. Typically, the signal-to-noise ratio of the image data is a direct measure of image quality of an image that is generated upon processing said image data. The signal-to-noise ratio is useful in ascertaining a balance between useful signal, which is the image data, and an unwanted noise that can degrade said image. It will be appreciated that the predefined threshold value refers to a minimum allowable signal-to-noise ratio of the image data, below which the image data is considered to be significantly noisy. Optionally, the predefined threshold value is 45 decibels.

It will be appreciated that the given criteria is satisfied even when only one of the aforementioned conditions is true. Once it is detected that the given criteria is satisfied, i.e., when the environment conditions of the real-world environment are detected to be low-light/dark environment conditions and/or when the image data is detected to be significantly noisy, light valves corresponding to at least the predefined percent of the colour filters of the fourth type are controlled to selectively allow light of particular wavelengths to pass through and be incident on the photo-sensitive cells of the image sensor. Herein, the phrase "at least the predefined percent of the colours filters of the fourth type" refers to a minimum number of colour filters of the fourth type, from amongst a total number of colour filters of the fourth type, that are selectively controlled. Optionally, the predefined percent of the colour filters of the fourth type lies in a range of 50 percent to 100 percent of the total number of colour filters of the fourth type. For example, the predefined percent of the colour filters of the fourth type (namely, the white colour filters or the near-white colour filters) may be higher than 60 percent. A technical effect of controlling said light valves when the given criteria is satisfied is that in poor lighting condition and/or in noisy conditions, maximum amount of light can be incident on the corresponding photo-sensitive cells to yield a high-quality low-noise image.

Herein, the corresponding light valves are controlled by configuring the at least one processor during the yet another time period, wherein the yet another time period is used for generating the yet another image. The yet another time period occurs after a time instant when it was detected that the given criteria is satisfied. The wavelengths lying in the first wavelength range, the second wavelength range and the third wavelength range, then passes through the corresponding light valves towards at least the predefined percent of the colour filters of the fourth type. Beneficially, this helps to reduce noise, because this allows to utilise the white or near-white filters to allow as much light as possible towards their corresponding photo-sensitive cells. Thereafter, the corresponding photo-sensitive cells have maximum exposure, as the light of a wide range of wavelengths is incident thereon.

Subsequently, the yet another image data is read out by the at least one processor from the image sensor, similar to the manner of reading out the image data and the another image data by the at least one processor, as described in detail earlier. Upon reading out the yet another image data, the at least one processor is configured to process the yet another image data to generate the yet another image. This yet another image is different from the given image. This processing of the yet another image data by the at least one processor is performed in a manner similar to the processing of the image data and the another image data to generate the given image and the another image, as described in detail earlier.

Optionally, the first wavelength range, the second wavelength range and the third wavelength range correspond to blue, green and red, respectively, and wherein the at least one processor is configured to:
  obtain information indicative of a gaze direction of a user;
  determine a gaze region in the photo-sensitive surface, based on the gaze direction; and
  for at least a predefined percent of the colour filters of the fourth type that correspond to those photo-sensitive cells that lie in the gaze region, control their corresponding light valves during the given time period to allow wavelengths lying in only one of: the second wavelength range, the third wavelength range, to pass through towards at least the predefined percent of said colour filters of the fourth type, wherein at least the predefined percent of said colour filters of the fourth type allow said wavelengths to pass therethrough towards their corresponding photo-sensitive cells.

Herein, the at least one processor is configured to obtain, from a client device, the information indicative of the gaze direction of the user. The client device could be implemented, for example, as a head-mounted display (HMD) device. Optionally, the client device comprises gaze-tracking means. The term "gaze direction" refers to a direction in which a given eye of the user is gazing. Such a gaze direction may be a gaze direction of a single user of the client device, or be an average gaze direction for multiple users of different client devices. The gaze direction may be represented by a gaze vector. Furthermore, the term "gaze-tracking means" refers to a specialized equipment for detecting and/or following gaze of the user's eyes. The gaze-tracking means could be implemented as contact lenses with sensors, cameras monitoring a position, a size and/or a shape of a pupil of the user's eye, and the like. The gaze-tracking means are well-known in the art. The term "head-mounted display" device refers to specialized equipment that is configured to present an extended-reality (XR) environment to the user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses augmented reality (AR), mixed reality (MR), and the like. It will be appreciated that when the imaging system is remotely located from the client device, the at least one processor obtains the information indicative of the gaze direction from the client device. Alternatively, when the imaging system is integrated into the client device, the at least one processor obtains the information indicative of the gaze direction from the gaze-tracking means of the client device.

Optionally, the gaze direction is a current gaze direction. Alternatively, optionally, the gaze direction is a predicted gaze direction. It will be appreciated that optionally the predicted gaze direction is predicted, based on a change in user's gaze, wherein the predicted gaze direction lies along a direction of the change in the user's gaze. In such a case, the change in the user's gaze could be determined in terms of a gaze velocity and/or a gaze acceleration of the given eye, using information indicative of previous gaze directions of the given eye and/or the current gaze direction of the given eye. Yet alternatively, optionally, the gaze direction is a default gaze direction, wherein the default gaze direction is straight towards a centre of a field of view of the image sensor. In this regard, it is considered that the gaze of the user's eye is, by default, typically directed towards a centre of his/her field of view. In such a case, a central region of a field of view of the user is resolved to a much greater degree of visual detail, as compared to a remaining, peripheral region of the field of view of the user. It is to be understood that a gaze position corresponding to the default gaze direction lies at a centre of the photosensitive surface.

Optionally, when determining the gaze region in the photo-sensitive surface, the at least one processor is configured to map the gaze direction of the given eye onto the photo-sensitive surface. The term "gaze region" refers to a region in the photo-sensitive surface onto which the gaze direction is mapped. The gaze region, for example, be a central region of the photo-sensitive surface, a top-left region of the photo-sensitive surface, a bottom-right region of the photo-sensitive surface, or similar.

It will be appreciated that the gaze region is selected dynamically, based on the gaze direction. In this regard, the gaze region corresponds to a gaze area (i.e., a region of interest). Such a dynamic manner of selecting the gaze region emulates a way in which the user actively focuses within his/her field of view. Determining the gaze region in the photo-sensitive surface is well-known in the art.

Subsequently, the at least one processor is configured to identify at least the predefined percent of the colour filters of the fourth type that correspond to the photo-sensitive cells lying within the gaze region. For this predefined percent of the colour filters of the fourth type that lie within the gaze region, the at least one processor is configured to control the corresponding light valves by allowing particular wavelengths lying in only one of: the second wavelength range, the third wavelength range, to pass through towards the colour filters of the fourth type. In other words, only green and red wavelengths are preferred in the gaze region, as a fovea of the user's eyes do not have blue cone cells. Hence, a colour response of the image sensor is adjusted in that gaze region, accordingly. Herein, the phrase "predefined percent of the colour filters of the fourth type" refers to a minimum number of colour filters of the fourth type based on the gaze direction, of the total number of colour filters of the fourth type. Optionally, the predefined percent of the colour filters of the fourth type lies in a range of 50 percent to 100 percent of the total number of colour filters of the fourth type. A technical effect of configuring the at least one processor based on the gaze directions in such a manner is that it facilitates tracking and segmentation of particular objects and/or regions of interest in the field of view of the camera. This technical benefit arises from the fact that the corresponding at least the predefined percent of colour filters of the fourth type are utilised to allow capture of colour data corresponding to the green colour and the red colour, namely those colours that are readily perceivable in the gaze region.

Optionally, the at least one processor is configured to:
detect when at least one image segment of a previous image represents at least one object that is in motion;
when it is detected that at least one image segment of a previous image represents at least one object that is in motion,
identify a colour of the at least one object from the previous image;
determine a region in the photo-sensitive surface corresponding to the at least one image segment of the previous image; and
for the colour filters of the fourth type that correspond to those photo-sensitive cells that lie in said region, control their corresponding light valves during the given time period to allow only wavelengths that correspond to the identified colour, to pass through towards said colour filters of the fourth type, wherein said colour filters of the fourth type allow said wavelengths to pass therethrough towards their corresponding photo-sensitive cells.

In this regard, the at least one object is present in the real-world environment, which is captured by the image sensor. The motion of the at least one object is represented relative to a head pose of the user, wherein the at least one object has changed positions in a sequence of images. Herein, the at least one object could be a dynamic object that is moving in a visual scene. Herein, the term "image segment" of the previous image refers to a part of the image that corresponds to pixels that represent the at least one object. It will be appreciated that the at least one image segment of the previous image may or may not have a defined shape and/or size. The at least one processor is optionally configured to employ a feature-extraction algorithm to identify the at least one image segment. The at least one processor is configured to extract the colour value of the at least one object from the previous image, which is used to identify the colour of the at least one object.

Optionally, when determining the region in the photo-sensitive surface, the at least one processor is configured to map the at least one image segment that represents the at least one object onto the photo-sensitive surface. This region, for example, be, a top-right region of the photo-sensitive surface, a bottom-left region of the photo-sensitive surface, or similar. It will be appreciated that the region is determined dynamically, based on a speed of the at least one object from the previous image. In this regard, while determining the region in the photo-sensitive surface corresponding to the at least one image segment of the previous image, the speed of the at least one object in motion is also taken into account. It will be appreciated that based on the speed of the at least one object in the previous image, the at least one processor is optionally configured to predict a position of the at least one object captured in the given image.

Subsequently, the at least one processor is configured to identify the colour filters of the fourth type that correspond to the photo-sensitive cells lying within the region. For these colour filters of the fourth type that lie within the region, the at least one processor is configured to control the corresponding light valves by allowing only particular wavelengths that corresponds to the identified colour of the at least one object. The particular wavelengths are further filtered by the colour filters of the fourth type, when the light passes therethrough, and is incident on the corresponding photo-sensitive cells. A technical effect of configuring the at least one processor in such a manner is that it facilitates better tracking of the at least one object in motion throughout the sequence of images, and accurately representing the at least one object in the given image.

The present disclosure also relates to the second aspect as described above. Various embodiments and variants disclosed above, with respect to the aforementioned first aspect, apply mutatis mutandis to the second aspect.

Optionally, the light valves of the grid are also arranged on optical paths of the first type of colour filters, the second type of colour filters and the third type of colour filters, the method comprising:

for a given colour filter of the first type, controlling a corresponding light valve during the given time period to allow wavelengths lying in a first valve-based wavelength range to pass through towards the given colour filter of the first type, wherein the given colour filter of the first type allows wavelengths lying in a first wavelength sub-range to pass therethrough towards a corresponding photo-sensitive cell, wherein the first wavelength sub-range corresponds to an overlap between the first valve-based wavelength range and the first wavelength range;

for a given colour filter of the second type, controlling a corresponding light valve during the given time period to allow wavelengths lying in a second valve-based wavelength range to pass through towards the given colour filter of the second type, wherein the given colour filter of the second type allows wavelengths lying in a second wavelength sub-range to pass therethrough towards a corresponding photo-sensitive cell, wherein the second wavelength sub-range corresponds to an overlap between the second valve-based wavelength range and the second wavelength range; and for a given colour filter of the third type, controlling a corresponding light valve during the given time period to allow wavelengths lying in a third valve-based wavelength range to pass through towards the given colour filter of the third type, wherein the given colour filter of the third type allows wavelengths lying in a third wavelength sub-range to pass therethrough towards a corresponding photo-sensitive cell, wherein the third wavelength sub-range corresponds to an overlap between the third valve-based wavelength range and the third wavelength range.

A technical effect is that a broad range of colours can be generated by combining and controlling a transmission of particular wavelengths of light through each type of colour filters.

Optionally, the method comprising:

for the given colour filter of the first type, controlling the corresponding light valve during another time period to allow wavelengths lying in another first valve-based wavelength range to pass through towards the given colour filter of the first type, wherein the given colour filter of the first type allows wavelengths lying in another first wavelength sub-range to pass therethrough towards the corresponding photo-sensitive cell, wherein the another first wavelength sub-range corresponds to an overlap between the another first valve-based wavelength range and the first wavelength range, and is different from the first wavelength sub-range;

for the given colour filter of the second type, controlling the corresponding light valve during the another time period to allow wavelengths lying in another second valve-based wavelength range to pass through towards the given colour filter of the second type, wherein the given colour filter of the second type allows wavelengths lying in another second wavelength sub-range to pass therethrough towards the corresponding photo-sensitive cell, wherein the another second wavelength sub-range corresponds to an overlap between the another second valve-based wavelength range and the second wavelength range, and is different from the second wavelength sub-range;

for the given colour filter of the third type, controlling the corresponding light valve during the another time period to allow wavelengths lying in another third valve-based wavelength range to pass through towards the given colour filter of the third type, wherein the given colour filter of the third type allows wavelengths lying in another third wavelength sub-range to pass therethrough towards the corresponding photo-sensitive cell, wherein the another third wavelength sub-range corresponds to an overlap between the another third valve-based wavelength range and the third wavelength range, and is different from the third wavelength sub-range; and for the given colour filter of the fourth type, controlling the corresponding light valve during the another time period to allow wavelengths lying in only one of: the first wavelength range, the second wavelength range, the third wavelength range, the first wavelength sub-range, the second wavelength sub-range, the third wavelength sub-range, to pass through towards the given colour filter of the fourth type, wherein the given colour filter of the fourth type allows said wavelengths to pass therethrough towards the corresponding photo-sensitive cell;

reading out another image data from the plurality of photo-sensitive cells; and processing the another image data to generate another image.

A technical effect of generating the another image in such a manner is that it creates a notable difference from the given image, so that the difference in colours in the two images (namely, the given image and the another given image) can be interpolated. This facilitates for providing a final image which captures intensities of all wavelengths, i.e., a spectral image.

Optionally, the method comprising generating a spectral image from the given image and the another image.

A technical effect of generating the spectral image is that it facilitates generation of insights into spectral signatures of various objects (as represented in the image and the another image) present in the real-world environment, wherein such spectral signatures are unique for every object.

Optionally, the method comprising:

detecting when a given criteria is satisfied, wherein the given criteria is satisfied when at least one of the following is true:
(i) an average illuminance of a real-world environment is lower than a predefined threshold illuminance;
(ii) a signal-to-noise ratio of the image data is lower than a predefined threshold value;

when it is detected that the given criteria is satisfied,
for at least a predefined percent of the colour filters of the fourth type, controlling their corresponding light valves during yet another time period to allow the wavelengths lying in the first wavelength range, the second wavelength range and the third wavelength range to pass through towards at least the predefined percent of the colour filters of the fourth type, wherein at least the predefined percent of the colour filters of the fourth type allow said wavelengths to pass therethrough towards their corresponding photo-sensitive cells;
reading out yet another image data from the plurality of photo-sensitive cells; and
processing the yet another image data to generate yet another image.

A technical effect of satisfying the given criteria is that in poor lighting condition and/or in noisy conditions, maximum amount of light can be incident on the corresponding photo-sensitive cells to yield a high-quality image.

Optionally, the first wavelength range, the second wavelength range and the third wavelength range correspond to blue, green and red, respectively, and wherein the at least one processor is configured to:
obtaining information indicative of a gaze direction of a user;
determining a gaze region in the photo-sensitive surface, based on the gaze direction; and
for at least a predefined percent of the colour filters of the fourth type that correspond to those photo-sensitive cells that lie in the gaze region, controlling their corresponding light valves during the given time period to allow wavelengths lying in only one of: the second wavelength range, the third wavelength range, to pass through towards at least the predefined percent of said colour filters of the fourth type, wherein at least the predefined percent of said colour filters of the fourth type allow said wavelengths to pass therethrough towards their corresponding photo-sensitive cells.

A technical effect of processing based on the gaze directions in such a manner is that it facilitates tracking and segmentation of particular objects and/or regions of interest in the field of view of the camera. This technical benefit arises from the fact that the corresponding at least the predefined percent of colour filters of the fourth type are utilised to allow capture of colour data corresponding to the green colour and the red colour, namely those colours that are readily perceivable in the gaze region.

Optionally, the method comprising:
detecting when at least one image segment of a previous image represents at least one object that is in motion;
when it is detected that at least one image segment of a previous image represents at least one object that is in motion,
identifying a colour of the at least one object from the previous image;
determining a region in the photo-sensitive surface corresponding to the at least one image segment of the previous image; and
for the colour filters of the fourth type that correspond to those photo-sensitive cells that lie in said region, controlling their corresponding light valves during the given time period to allow only wavelengths that correspond to the identified colour, to pass through towards said colour filters of the fourth type, wherein said colour filters of the fourth type allow said wavelengths to pass therethrough towards their corresponding photo-sensitive cells.

A technical effect of processing in such a manner is that it facilitates better tracking of the at least one object in motion throughout the sequence of images, and accurately representing the at least one object in the given image.

In the aforementioned first and second aspects, the light valve device is used with the colour filter array, so that a given wavelength range of a given type of colour filters can be controlled and/or adjusted dynamically. There will now be described other aspects in which the light valve device is used without a need for the colour filter array.

In a third aspect, the present disclosure provides an imaging system comprising:
an image sensor comprising:
a plurality of photo-sensitive cells arranged on a photo-sensitive surface of the image sensor; and
a light valve device comprising an array of light valves, wherein the array of light valves is arranged on an optical path of the photo-sensitive surface of the image sensor; and
at least one processor configured to:
divide the array of light valves into groups of neighbouring light valves, each group comprising at least three light valves;
for a given group of neighbouring light valves,
control at least one first light valve in the given group, during a given time period, to allow wavelengths lying in one of: a first wavelength range, a first wavelength sub-range to pass through towards a corresponding photo-sensitive cell, the first wavelength sub-range being narrower than and lying within the first wavelength range;
control at least one second light valve in the given group, during the given time period, to allow wavelengths lying in one of: a second wavelength range, a second wavelength sub-range to pass through towards a corresponding photo-sensitive cell, the second wavelength sub-range being narrower than and lying within the second wavelength range; and
control at least one third light valve in the given group, during the given time period, to allow wavelengths lying in one of: a third wavelength range, a third wavelength sub-range to pass through towards a corresponding photo-sensitive cell, the third wavelength sub-range being narrower than and lying within the third wavelength range;
read out image data from the plurality of photo-sensitive cells; and
process the image data to generate a given image.

In a fourth aspect, the present disclosure provides a method implemented by an imaging system comprising an image sensor comprising a plurality of photo-sensitive cells, and a light valve device comprising an array of light valves, the method incorporating adjustable colour filter array using the light valve device, the method comprising:
dividing the array of light valves into groups of neighbouring light valves, each group comprising at least three light valves;
for a given group of neighbouring light valves,
controlling at least one first light valve in the given group, during a given time period, to allow wavelengths lying in one of: a first wavelength range, a first wavelength sub-range to pass through towards a corresponding photo-sensitive cell, the first wavelength sub-range being narrower than and lying within the first wavelength range;

controlling at least one second light valve in the given group, during the given time period, to allow wavelengths lying in one of: a second wavelength range, a second wavelength sub-range to pass through towards a corresponding photo-sensitive cell, the second wavelength sub-range being narrower than and lying within the second wavelength range; and controlling at least one third light valve in the given group, during the given time period, to allow wavelengths lying in one of: a third wavelength range, a third wavelength sub-range to pass through towards a corresponding photo-sensitive cell, the third wavelength sub-range being narrower than and lying within the third wavelength range;

reading out image data from the plurality of photo-sensitive cells; and processing the image data to generate a given image.

The present disclosure provides the aforementioned third aspect and the aforementioned fourth aspect to generate high-quality and realistic images, by processing image data that is read out from the plurality of photo-sensitive cells that receives light from particular wavelengths only. Herein, the light valve device emulates a colour filter array, wherein particular wavelengths are filtered by controlling the array of light valves. Such filtering is performed by controlling the array of light valves in such a manner that the at least three light valves allow only wavelengths corresponding to respective ones of blue colour, green colour and red colour to pass through. The spectral response of the light valves is controlled accurately. Therefore, upon processing the image data, a high visual quality (for example, in terms of a native resolution, a high contrast, a realistic and accurate colour reproduction, and the like) is achieved in the given image, as well as low noise is achieved as only the particular wavelengths are allowed to be incident on the photo-sensitive surface of the image sensor. This considerably improves a viewing experience of a user (for example, in terms of realism and immersiveness), when the given image is displayed to the user. The aforementioned third aspect and the fourth aspect also reduces a processing time and processing resources of the at least one processor. This potentially makes the imaging system suitable for use with demanding applications (such as extended-reality applications). The method and the imaging system are simple, robust, fast, reliable, and can be implemented with ease.

The light valve device comprises the array of light valves corresponding to the plurality of photo-sensitive cells, wherein the array of light valves is arranged (in other words, is overlayed) directly in front of the plurality of the photo-sensitive cells. The array of light valves is arranged in such a manner that the light to be incident on the photo-sensitive surface of the image sensor, first passes through the array of the light valves. The light valves in the array could be arranged in a continuous manner.

The neighbouring light valves within each group could be contiguous or adjacent to each other within the array. Each group comprises at least three light valves, which is a smallest allowable sub-grouping within the array comprising the groups of neighbouring light valves. The at least three light valves correspond to three different colours to enable generating of colour data of the corresponding photo-sensitive cells in the image sensor. This also facilitates to modulate or manipulate an exposure of the light on the photo-sensitive surface, by controlling the at least one light valve in the group of neighbouring cells. A technical effect of dividing the array of light valves into such groups is that it enables the at least one processor to provide a granular level of control within the imaging system. Hence, the at least one processor is configured to allow light of specific wavelengths to be incident on the corresponding photo-sensitive cells of the photo-sensitive surface, for capturing corresponding image data.

Notably, there are at least three light valves in each group, as discussed earlier. In an example, for a Red-Green-Blue-White (RGBW)-based implementation, and from amongst the at least three light valves in the given group, the at least one first light valve may allow wavelengths of blue colour, the at least one second light valve may allow wavelengths of green colour, and the at least one first light valve may allow wavelengths of red colour. In this regard, for generating an RGB image, the first wavelength range (that corresponds to the wavelengths of the blue colour) may be from 400 nanometres (nm) to 480 nm, the second wavelength range (that corresponds to the wavelengths of the green colour) may be from 480 nanometres (nm) to 580 nm, and the third wavelength range (that corresponds to the wavelengths of the blue colour) may be from 580 nanometres (nm) to 700 nm. Furthermore, the first wavelength sub-range, the second wavelength sub-range, and the third wavelength sub-range, are used to generate a spectral image.

Subsequently, the image data is read out from the plurality of photo-sensitive cells, as described in detail earlier. Thereafter the image data is processed to generate the given image, as described in detail earlier.

Optionally, the at least one processor is configured to:
for another group of neighbouring light valves,
control at least one another first light valve in the another group, during the given time period, to allow wavelengths lying in one of: the first wavelength range, another first wavelength sub-range to pass through towards a corresponding photo-sensitive cell, the another first wavelength sub-range being narrower than and lying within the first wavelength range, and being different from the first wavelength sub-range;

control at least one another second light valve in the another group, during the given time period, to allow wavelengths lying in one of: the second wavelength range, another second wavelength sub-range to pass through towards a corresponding photo-sensitive cell, the another second wavelength sub-range being narrower than and lying within the second wavelength range, and being different from the second wavelength sub-range; and control at least one another third light valve in the another group, during the given time period, to allow wavelengths lying in one of: the third wavelength range, another third wavelength sub-range to pass through towards a corresponding photo-sensitive cell, the another third wavelength sub-range being narrower than and lying within the third wavelength range, and being different from the third wavelength sub-range.

A technical effect of controlling at least one another given light valve in another group in such a manner is that it creates a notable difference in the given image in terms of colour, and this difference in colour can be interpolated. This enables the at least one processor to provide a final image which captures intensities of different wavelength sub-ranges, i.e., the spectral image. Herein, the phrase "at least one another given first light valve" encompasses namely the at least one another first light valve, at least one another second light valve, and/or the at least one third light valve.

Herein, the at least one another given light valve is controlled by configuring the at least one processor during the given time period. Such controlling only allows wavelengths lying in one of: a given wavelength range, another given wavelength sub-range, while selectively blocking other wavelengths. Herein, the phrase "given wavelength range" encompasses namely the first wavelength range, the second wavelength range, and/or the third wavelength range. The term "another given wavelength sub-range" encompasses namely the another first wavelength sub-range, the another second wavelength sub-range, and/or the another third wavelength sub-range.

Optionally, the at least three light valves of each group comprise at least four light valves, and wherein the at least one processor is configured to:
 detect when a given criteria is satisfied, wherein the given criteria is satisfied when at least one of the following is true:
  (i) an average illuminance of a real-world environment is lower than a predefined threshold illuminance;
  (ii) a signal-to-noise ratio of the image data is lower than a predefined threshold value;
 when it is detected that the given criteria is satisfied, for the given group of neighbouring light valves, control at least one fourth light valve in the given group, during the given time period, to allow wavelengths lying in the first wavelength range, the second wavelength range and the third wavelength range to pass through towards a corresponding photo-sensitive cell.

In this regard, each group comprises at least four light valves to allow maximum exposure of the corresponding photo-sensitive cells in low-light environmental conditions. Once it is detected that the given criteria is satisfied, i.e., when the environment conditions of the real-world environment are detected to be low-light/dark environment conditions and/or when the image data is detected to be significantly noisy, the at least one fourth light valve is selectively controlled to allow light of wavelengths that lies in the first wavelength range, the second wavelength range and the third wavelength range to pass through simultaneously and be incident on the corresponding photo-sensitive cells of the image sensor. In other words, the at least one fourth light valve emulates a white colour filter, which selectively allows lights of particular wavelengths to pass through. Beneficially, this effectively reduces a level of noise in the given image. A technical effect of satisfying the given criteria is that in poor lighting condition and/or in noisy conditions, maximum amount of light can be incident on the corresponding photo-sensitive cells to yield a high-quality image.

Optionally, the first wavelength range, the second wavelength range and the third wavelength range correspond to blue, green and red, respectively, and wherein the at least one processor is configured to:
 obtain information indicative of a gaze direction of a user;
 determine a gaze region in the photo-sensitive surface, based on the gaze direction; and
 for at least a predefined percent of groups of neighbouring light valves that correspond to those photo-sensitive cells that lie in the gaze region, control their corresponding first light valves during the given time period to allow wavelengths lying in only one of: the second wavelength range, the third wavelength range, to pass through towards their corresponding photo-sensitive cells.

Herein, the at least one processor is configured to obtain the information indicative of the gaze direction of the user in a similar manner as described earlier. The determination of the gaze region by configuring the at least one processor is performed in a similar manner as described earlier. The at least one processor is configured to identify at least the predefined percent of groups of neighbouring light valves that correspond to the photo-sensitive cells lying within the gaze region. Herein, at least the predefined percent of groups of neighbouring light valves selectively allow light of only particular wavelengths that lie in only one of: the second wavelength range, the third wavelength range, to pass through to pass therethrough and be incident on the corresponding photo-sensitive cells. In other words, only green and red wavelengths are preferred in the gaze region, as a fovea of the user's eyes do not have blue cone cells. Hence, a colour response of the image sensor is adjusted in that gaze region, accordingly. Herein, the phrase "at least the predefined percent of groups of neighbouring light valves" refers to a minimum number of groups of neighbouring light valves based on the gaze direction, of the total number of groups of neighbouring light valves. Optionally, the predefined percent of groups of neighbouring light valves lies in a range of 50 percent to 100 percent of the total number of groups of neighbouring light valves. A technical effect of configuring the at least one processor based on the gaze directions in such a manner is that it facilitates tracking and segmentation of particular objects and/or regions of interest in the field of view of the camera. This technical benefit arises from the fact that the corresponding first light valves are utilised to allow capture of colour data corresponding to the green colour and the red colour, namely those colours that are readily perceivable in the gaze region.

Optionally, the at least one processor is configured to:
 detect when at least one image segment of a previous image represents at least one object that is in motion;
 when it is detected that at least one image segment of a previous image represents at least one object that is in motion,
  identify a colour of the at least one object from previous image;
  determine a region in the photo-sensitive surface corresponding to the at least one image segment of the previous image; and
  for groups of neighbouring light valves that correspond to those photo-sensitive cells that lie in said region, control their corresponding light valves during the given time period to allow only wavelengths that correspond to the identified colour, to pass through towards their corresponding photo-sensitive cells.

Herein, the at least one processor is configured to identify which group from amongst the groups of neighbouring light valves that correspond to the photo-sensitive cells lying within the region. Subsequently, the light valves in such groups are controlled in such a manner that light of only particular wavelengths that correspond to the identified colour are allowed to pass through. A technical effect of configuring the at least one processor in such a manner is that it facilitates better tracking of the at least one object in motion throughout the sequence of images, and accurately representing the at least one object in the given image.

The present disclosure also relates to the fourth aspect as described above. Various embodiments and variants disclosed above, with respect to the aforementioned third aspect, apply mutatis mutandis to the fourth aspect.

Optionally, the method comprising:
for another group of neighbouring light valves,
controlling at least one another first light valve in the another group, during the given time period, to allow wavelengths lying in one of: the first wavelength range, another first wavelength sub-range to pass through towards a corresponding photo-sensitive cell, the another first wavelength sub-range being narrower than and lying within the first wavelength range, and being different from the first wavelength sub-range;
controlling at least one another second light valve in the another group, during the given time period, to allow wavelengths lying in one of: the second wavelength range, another second wavelength sub-range to pass through towards a corresponding photo-sensitive cell, the another second wavelength sub-range being narrower than and lying within the second wavelength range, and being different from the second wavelength sub-range; and
controlling at least one another third light valve in the another group, during the given time period, to allow wavelengths lying in one of: the third wavelength range, another third wavelength sub-range to pass through towards a corresponding photo-sensitive cell, the another third wavelength sub-range being narrower than and lying within the third wavelength range, and being different from the third wavelength sub-range.

A technical effect of controlling at least one another given light valve in another group in such a manner is that it creates a notable difference in the given image in terms of colour, and this difference in colour can be interpolated.

Optionally, the at least three light valves of each group comprise at least four light valves, and wherein the method comprises:
detecting when a given criteria is satisfied, wherein the given criteria is satisfied when at least one of the following is true:
(i) an average illuminance of a real-world environment is lower than a predefined threshold illuminance;
(ii) a signal-to-noise ratio of the image data is lower than a predefined threshold value;
when it is detected that the given criteria is satisfied, for the given group of neighbouring light valves, controlling at least one fourth light valve in the given group, during the given time period, to allow wavelengths lying in the first wavelength range, the second wavelength range and the third wavelength range to pass through towards a corresponding photo-sensitive cell.

A technical effect of satisfying the given criteria is that in poor lighting condition and/or in noisy conditions, maximum amount of light can be incident on the corresponding photo-sensitive cells to yield a high-quality image.

Optionally, the first wavelength range, the second wavelength range and the third wavelength range correspond to blue, green and red, respectively, and wherein the method comprises:
obtaining information indicative of a gaze direction of a user;
determining a gaze region in the photo-sensitive surface, based on the gaze direction; and
for at least a predefined percent of groups of neighbouring light valves that correspond to those photo-sensitive cells that lie in the gaze region, controlling their corresponding first light valves during the given time period to allow wavelengths lying in only one of: the second wavelength range, the third wavelength range, to pass through towards their corresponding photo-sensitive cells.

A technical effect of processing based on the gaze directions in such a manner is that it facilitates tracking and segmentation of particular objects and/or regions of interest in the field of view of the camera. This technical benefit arises from the fact that the corresponding first light valves are utilised to allow capture of colour data corresponding to the green colour and the red colour, namely those colours that are readily perceivable in the gaze region.

Optionally, the method comprising:
detecting when at least one image segment of a previous image represents at least one object that is in motion;
when it is detected that at least one image segment of a previous image represents at least one object that is in motion,
identifying a colour of the at least one object from previous image;
determining a region in the photo-sensitive surface corresponding to the at least one image segment of the previous image; and
for groups of neighbouring light valves that correspond to those photo-sensitive cells that lie in said region, controlling their corresponding light valves during the given time period to allow only wavelengths that correspond to the identified colour, to pass through towards their corresponding photo-sensitive cells.

A technical effect of processing in such a manner is that it facilitates better tracking of the at least one object in motion throughout the sequence of images, and accurately representing the at least one object in the given image.

DETAILED DESCRIPTION OF THE DRAWINGS

Figure 2:
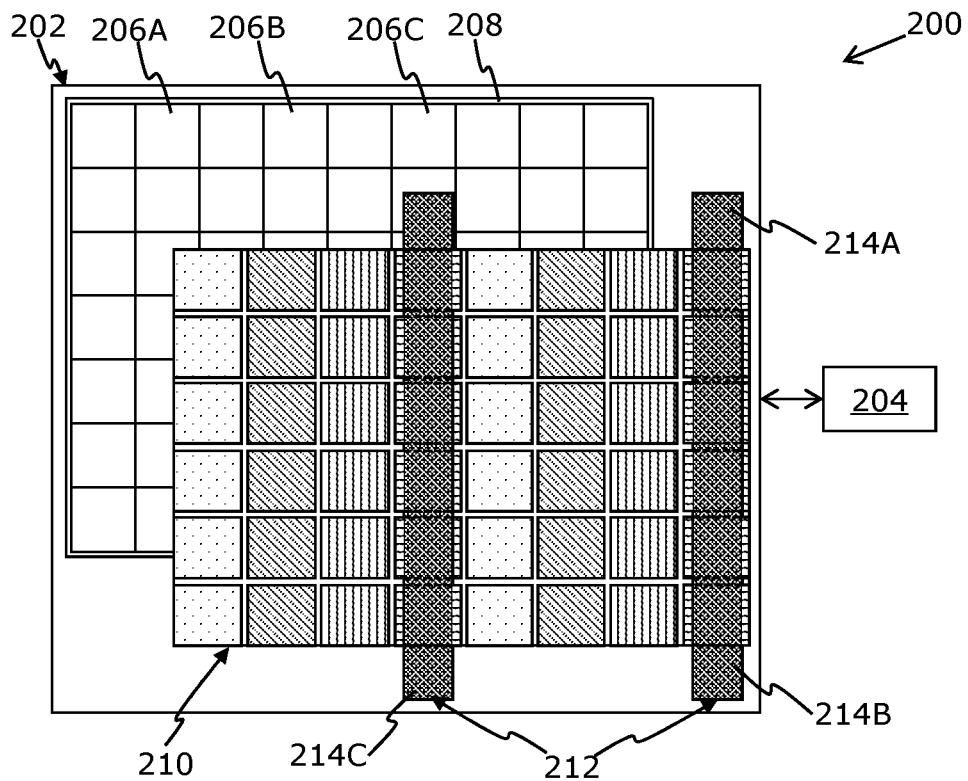
FIG. 2 shows a schematic illustration of an architecture of an imaging system incorporating adjustable colour filter array, in accordance with an embodiment according to the aforementioned first and second aspects of the present disclosure.

Referring to FIG. 2, there is shown a schematic illustration of an architecture of an imaging system 200 incorporating an adjustable colour filter array, in accordance with an embodiment according to the aforementioned first and second aspects of the present disclosure. The imaging system 200 comprises an image sensor 202, and at least one processor (depicted as a processor 204). The image sensor 202 comprises a plurality of photo-sensitive cells (depicted as photo-sensitive cells 206A, 206B, and 206C) arranged on a photo-sensitive surface 208 of the image sensor 202, a colour filter array 210 arranged on an optical path of the photo-sensitive surface 208 of the image sensor 202, and a light valve device 212 comprising a grid of light valves (depicted as light valves 214A, 214B, and 214C). The colour filter array 210 comprises: a first type (as shown by dotted pattern) of colour filters that allow wavelengths lying in a first wavelength range to pass through; a second type (as shown by downwards diagonally striped-pattern) of colour filters that allow wavelengths lying in a second wavelength range to pass through; a third type (as shown by vertically striped-pattern) of colour filters that allow wavelengths lying in a third wavelength range to pass through; and a fourth type (as shown by horizontally striped-pattern) of colour filters that allow wavelengths lying in the first wavelength range, the second wavelength range and the third wavelength range to pass through. The light valves 214A-C of said grid are arranged on optical paths of at least the fourth type of colour filters. The processor 204 is communicably coupled with the image sensor 202. The processor 204 is configured to perform various operations, as described earlier with respect to the aforementioned first and second aspects.

Figure 1B:
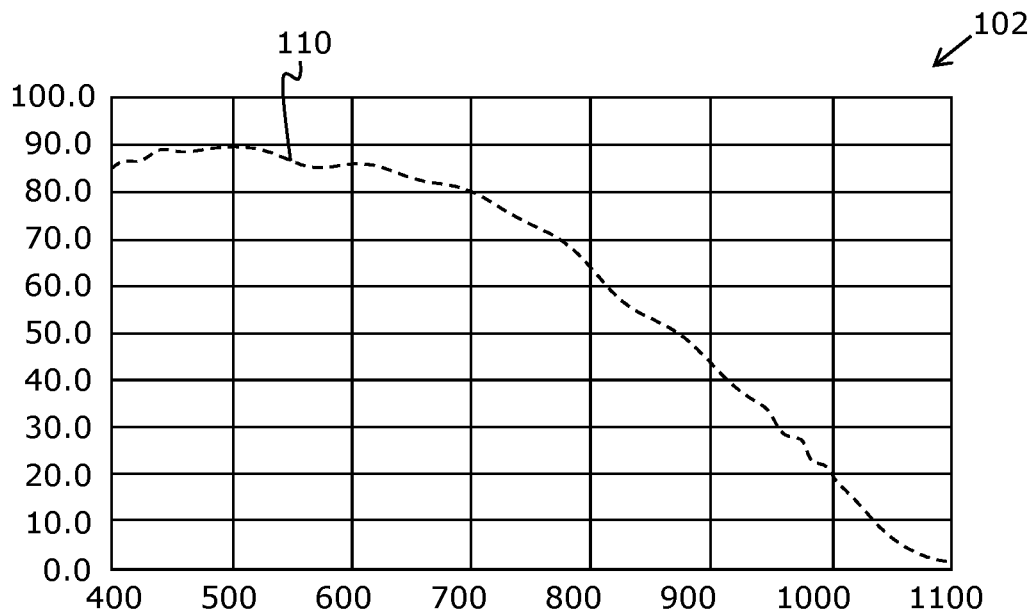

It may be understood by a person skilled in the art that FIG. 1 includes a simplified architecture of the imaging system 200, for sake of clarity, which should not unduly limit the scope of the claims herein. It is to be understood that the specific implementation of the imaging system 200 is provided as an example and is not to be construed as limiting it to specific numbers or types of image sensors, processors, photo-sensitive cells, colour filter arrays, and light valve devices. The person skilled in the art will recognize many variations, alternatives, and modifications of embodiments of the present disclosure.

Figure 3:
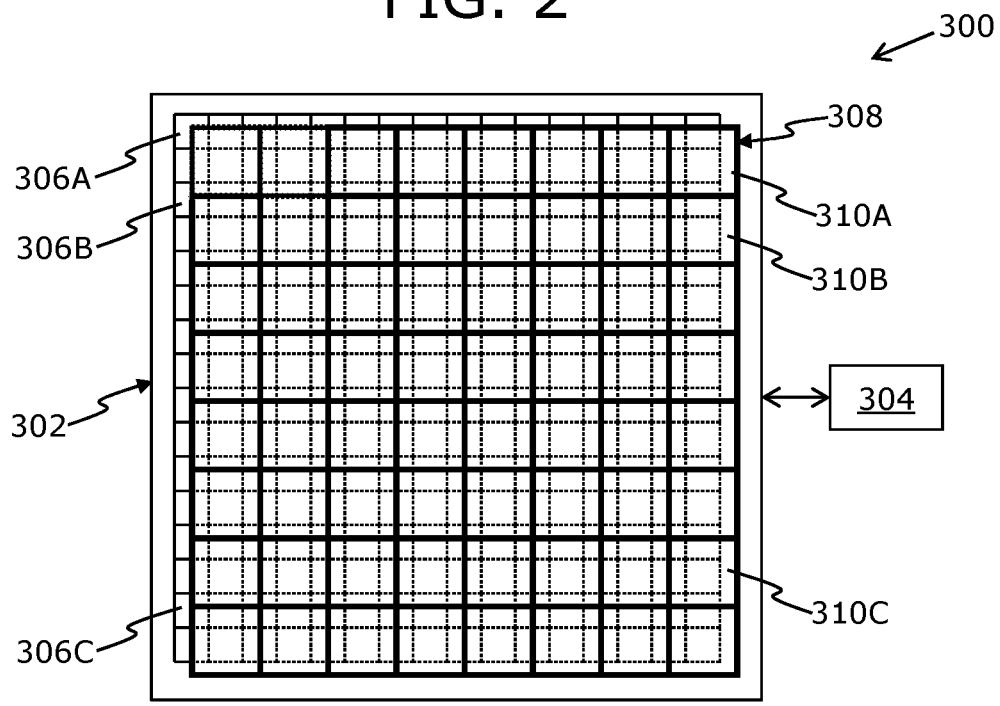
FIG. 3 shows a schematic illustration of an architecture of an imaging system incorporating adjustable colour filter array, in accordance with another embodiment according to the aforementioned third and fourth aspects of the present disclosure.

Referring to FIG. 3, there is shown a schematic illustration of an architecture of an imaging system 300 incorporating an adjustable colour filter array, in accordance with another embodiment according to the aforementioned third and fourth aspects of the present disclosure. The imaging system 300 comprises an image sensor 302 and at least one processor (depicted as a processor 304). The image sensor 302 comprises a plurality of photo-sensitive cells (depicted as photo-sensitive cells 306A, 306B, and 306C) arranged on a photo-sensitive surface of the image sensor 302, and a light valve device 308. The light valve device 308 comprises an array of light valves (depicted as light valves 310A, 310B, and 310C), wherein the light valves are arranged on an optical path of the photo-sensitive surface of the image sensor 302. The processor 304 is communicably coupled with the image sensor 302. The processor 304 is configured to perform various operations, as described earlier with respect to the aforementioned first aspect.

It may be understood by a person skilled in the art that FIG. 1 includes a simplified architecture of the imaging system 300, for sake of clarity, which should not unduly limit the scope of the claims herein. It is to be understood that the specific implementation of the imaging system 300 is provided as an example and is not to be construed as limiting it to specific numbers or types of image sensors, processors, photo-sensitive cells, and light valve devices. The person skilled in the art will recognize many variations, alternatives, and modifications of embodiments of the present disclosure.

Figure 4A:
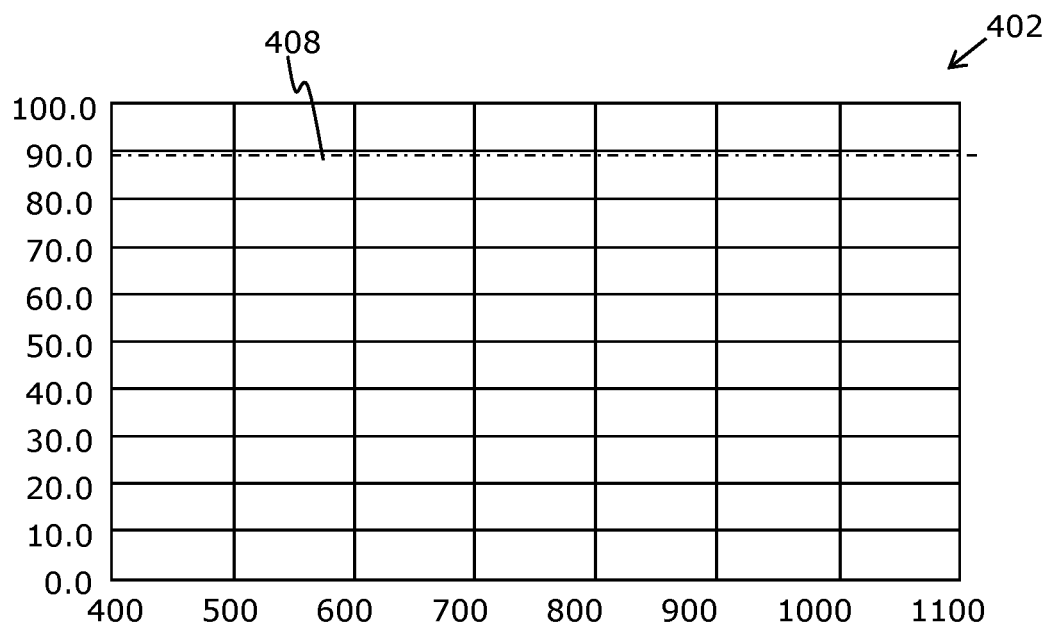
Figure 4B:
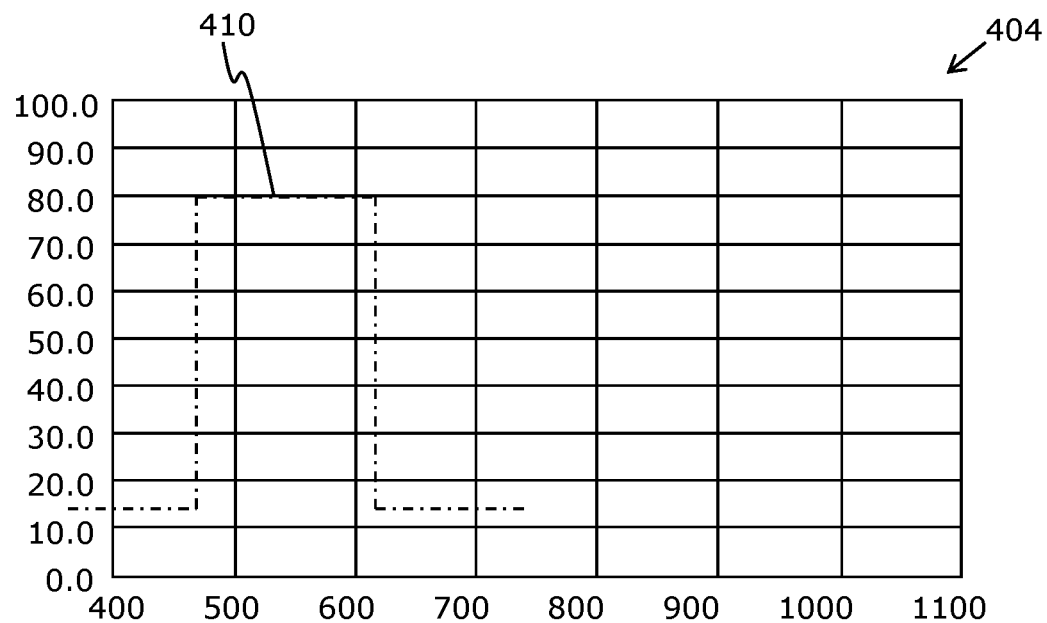

Referring to FIGS. 4A, 4B and 4C illustrate exemplary graphical representations 402, 404, and 406 of colour responses when the imaging system of FIG. 2 is in use, in accordance with an embodiment of the present disclosure according to the aforementioned first and second aspects. In FIGS. 4A-C, the graphical representations 402, 404, and 406 depict responses of different colour filters when used with corresponding light valves. The horizontal axis represents the wavelengths of the colour responses in nanometres (nm), and the vertical axis represents the response in the form of efficiency in percent. In FIG. 4A, the graphical representation shows a response (as shown by line 408) of a white colour filter when used with a corresponding light valve that is either switched off or controlled to allow all of the first wavelength range, the second wavelength range and the third wavelength range. Herein, the white pixel response is well-defined, and a balanced combination of the RGB colours is obtained.

In FIG. 4B, the graphical representation shows a response (as shown by line 410) of the white colour filter when used with the corresponding light valve that is controlled to allow wavelengths lying in a wavelength range of green colour to pass therethrough. The line 410 depicts a well-defined square waveform, thereby making the green colour easily distinguishable from other colours.

In FIG. 4C, the graphical representation shows a response (as shown by line 412) of the white colour filter when used with the corresponding light valve that is controlled to allow wavelengths lying in a wavelength range of red colour to pass therethrough. The line 412 also depicts a well-defined square waveform, thereby making the red colour easily distinguishable from other colours.

FIGS. 4A-C are merely examples, which should not unduly limit the scope of the claims herein. A person skilled in the art will recognize many variations, alternatives, and modifications of embodiments of the present disclosure.

Referring to FIG. 5, illustrated are steps of a method incorporating adjustable colour filter array using light valve devices, in accordance with an embodiment according to the aforementioned first and second aspects of the present disclosure. The method is implemented by an imaging system comprising an image sensor and at least one processor. The image sensor comprises:

a plurality of photo-sensitive cells arranged on a photo-sensitive surface of the image sensor;

a colour filter array arranged on an optical path of the photo-sensitive surface of the image sensor, the colour filter array comprising:

a first type of colour filters that allow wavelengths lying in a first wavelength range to pass through;

a second type of colour filters that allow wavelengths lying in a second wavelength range to pass through;

a third type of colour filters that allow wavelengths lying in a third wavelength range to pass through; and a fourth type of colour filters that allow wavelengths lying in the first wavelength range, the second wavelength range and the third wavelength range to pass through; and a light valve device comprising a grid of light valves, wherein the light valves of said grid are arranged on optical paths of at least the fourth type of colour filters.

At step 502, for a given colour filter of the fourth type, a corresponding light valve is controlled during a given time period to allow wavelengths lying in only one of: the first wavelength range, the second wavelength range, the third wavelength range, to pass through towards the given colour filter of the fourth type, wherein the given colour filter of the fourth type allows said wavelengths to pass therethrough towards a corresponding photo-sensitive cell. At step 504, image data is read out from the plurality of photo-sensitive cells. At step 506, the image data is processed to generate a given image.

The aforementioned steps are only illustrative and other alternatives can also be provided where one or more steps are added, one or more steps are removed, or one or more steps are provided in a different sequence without departing from the scope of the claims herein.

Referring to FIG. 6, illustrated are steps of a method incorporating adjustable colour filter array using light valve devices, in accordance with another embodiment according to the aforementioned third and fourth aspects of the present disclosure. The method is implemented by an imaging system comprising an image sensor and at least one processor, the image sensor comprising a plurality of photo-sensitive cells, and a light valve device comprising a grid of light valves. At step 602, the array of light valves are divided into groups of neighbouring light valves, each group comprising at least three light valves. At step 604a, at least one first light valve in the given group is controlled, during a given time period, to allow wavelengths lying in one of: a first wavelength range, a first wavelength sub-range to pass through towards a corresponding photo-sensitive cell, the first wavelength sub-range being narrower than and lying within the first wavelength range. At step 604b, at least one second light valve in the given group is controlled, during the given time period, to allow wavelengths lying in one of: a second wavelength range, a second wavelength sub-range to pass through towards a corresponding photo-sensitive cell, the second wavelength sub-range being narrower than and lying within the second wavelength range. At step 604c, at least one third light valve in the given group is controlled, during the given time period, to allow wavelengths lying in one of: a third wavelength range, a third wavelength sub-range to pass through towards a corresponding photo-sensitive cell, the third wavelength sub-range being narrower than and lying within the third wavelength range. The steps 604a-c are performed for a given group of neighbouring light valves. At step 606, image data is read out from the plurality of photo-sensitive cells. At step 608, the image data is processed to generate a given image.

The aforementioned steps are only illustrative and other alternatives can also be provided where one or more steps are added, one or more steps are removed, or one or more steps are provided in a different sequence without departing from the scope of the claims herein.

The invention claimed is:

1. An imaging system comprising:
    an image sensor comprising:
        a plurality of photo-sensitive cells arranged on a photo-sensitive surface of the image sensor;
        a colour filter array arranged on an optical path of the photo-sensitive surface of the image sensor, the colour filter array comprising:
            a first type of colour filters that allow wavelengths lying in a first wavelength range to pass through;
            a second type of colour filters that allow wavelengths lying in a second wavelength range to pass through;
            a third type of colour filters that allow wavelengths lying in a third wavelength range to pass through; and
            a fourth type of colour filters that allow wavelengths lying in the first wavelength range, the second wavelength range and the third wavelength range to pass through; and
        a light valve device comprising a grid of light valves, wherein the light valves of said grid are arranged on optical paths of at least the fourth type of colour filters; and
    at least one processor configured to:
        for a given colour filter of the fourth type, control a corresponding light valve during a given time period to allow wavelengths lying in only one of: the first wavelength range, the second wavelength range, the third wavelength range, to pass through towards the given colour filter of the fourth type, wherein the given colour filter of the fourth type allows said wavelengths to pass therethrough towards a corresponding photo-sensitive cell;
        read out image data from the plurality of photo-sensitive cells; and
        process the image data to generate a given image.

2. The imaging system of claim 1, wherein the light valves of the grid are also arranged on optical paths of the first type of colour filters, the second type of colour filters and the third type of colour filters, wherein the at least one processor is configured to:
    for a given colour filter of the first type, control a corresponding light valve during the given time period to allow wavelengths lying in a first valve-based wavelength range to pass through towards the given colour filter of the first type, wherein the given colour filter of the first type allows wavelengths lying in a first wavelength sub-range to pass therethrough towards a corresponding photo-sensitive cell, wherein the first wavelength sub-range corresponds to an overlap between the first valve-based wavelength range and the first wavelength range;
    for a given colour filter of the second type, control a corresponding light valve during the given time period to allow wavelengths lying in a second valve-based wavelength range to pass through towards the given colour filter of the second type, wherein the given colour filter of the second type allows wavelengths lying in a second wavelength sub-range to pass therethrough towards a corresponding photo-sensitive cell, wherein the second wavelength sub-range corresponds to an overlap between the second valve-based wavelength range and the second wavelength range; and
    for a given colour filter of the third type, control a corresponding light valve during the given time period to allow wavelengths lying in a third valve-based wavelength range to pass through towards the given colour filter of the third type, wherein the given colour filter of the third type allows wavelengths lying in a third wavelength sub-range to pass therethrough towards a corresponding photo-sensitive cell, wherein the third wavelength sub-range corresponds to an overlap between the third valve-based wavelength range and the third wavelength range.

3. The imaging system of claim 2, wherein the at least one processor is configured to:
    for the given colour filter of the first type, control the corresponding light valve during another time period to allow wavelengths lying in another first valve-based wavelength range to pass through towards the given colour filter of the first type, wherein the given colour filter of the first type allows wavelengths lying in another first wavelength sub-range to pass therethrough towards the corresponding photo-sensitive cell, wherein the another first wavelength sub-range corresponds to an overlap between the another first valve-based wavelength range and the first wavelength range, and is different from the first wavelength sub-range;
    for the given colour filter of the second type, control the corresponding light valve during the another time period to allow wavelengths lying in another second valve-based wavelength range to pass through towards the given colour filter of the second type, wherein the given colour filter of the second type allows wavelengths lying in another second wavelength sub-range to pass therethrough towards the corresponding photo-sensitive cell, wherein the another second wavelength sub-range corresponds to an overlap between the another second valve-based wavelength range and the second wavelength range, and is different from the second wavelength sub-range;
    for the given colour filter of the third type, control the corresponding light valve during the another time period to allow wavelengths lying in another third valve-based wavelength range to pass through towards the given colour filter of the third type, wherein the given colour filter of the third type allows wavelengths lying in another third wavelength sub-range to pass therethrough towards the corresponding photo-sensitive cell, wherein the another third wavelength sub-range corresponds to an overlap between the another third valve-based wavelength range and the third wavelength range, and is different from the third wavelength sub-range; and for the given colour filter of the fourth type, control the corresponding light valve during the another time period to allow wavelengths lying in only one of: the first wavelength range, the second wavelength range, the third wavelength range, the first wavelength sub-range, the second wavelength sub-range, the third wavelength sub-range, to pass through towards the given colour filter of the fourth type, wherein the given colour filter of the fourth type allows said wavelengths to pass therethrough towards the corresponding photo-sensitive cell;

read out another image data from the plurality of photo-sensitive cells; and process the another image data to generate another image.

4. The imaging system of claim 3, wherein the at least one processor is configured to generate a spectral image from the given image and the another image.

5. The imaging system of claim 1, wherein the at least one processor is configured to:

detect when a given criteria is satisfied, wherein the given criteria is satisfied when at least one of the following is true:
  (i) an average illuminance of a real-world environment is lower than a predefined threshold illuminance;
  (ii) a signal-to-noise ratio of the image data is lower than a predefined threshold value;

when it is detected that the given criteria is satisfied,
  for at least a predefined percent of the colour filters of the fourth type, control their corresponding light valves during yet another time period to allow the wavelengths lying in the first wavelength range, the second wavelength range and the third wavelength range to pass through towards at least the predefined percent of the colour filters of the fourth type, wherein at least the predefined percent of the colour filters of the fourth type allow said wavelengths to pass therethrough towards their corresponding photo-sensitive cells;
  read out yet another image data from the plurality of photo-sensitive cells; and
  process the yet another image data to generate yet another image.

6. The imaging system of claim 1, wherein the first wavelength range, the second wavelength range and the third wavelength range correspond to blue, green and red, respectively, and wherein the at least one processor is configured to:

obtain information indicative of a gaze direction of a user;

determine a gaze region in the photo-sensitive surface, based on the gaze direction; and for at least a predefined percent of the colour filters of the fourth type that correspond to those photo-sensitive cells that lie in the gaze region, control their corresponding light valves during the given time period to allow wavelengths lying in only one of: the second wavelength range, the third wavelength range, to pass through towards at least the predefined percent of said colour filters of the fourth type, wherein at least the predefined percent of said colour filters of the fourth type allow said wavelengths to pass therethrough towards their corresponding photo-sensitive cells.

7. The imaging system of claim 1, wherein the at least one processor is configured to:

detect when at least one image segment of a previous image represents at least one object that is in motion;

when it is detected that at least one image segment of a previous image represents at least one object that is in motion,
  identify a colour of the at least one object from the previous image;
  determine a region in the photo-sensitive surface corresponding to the at least one image segment of the previous image; and
  for the colour filters of the fourth type that correspond to those photo-sensitive cells that lie in said region, control their corresponding light valves during the given time period to allow only wavelengths that correspond to the identified colour, to pass through towards said colour filters of the fourth type, wherein said colour filters of the fourth type allow said wavelengths to pass therethrough towards their corresponding photo-sensitive cells.

8. An imaging system comprising:

an image sensor comprising:
  a plurality of photo-sensitive cells arranged on a photo-sensitive surface of the image sensor; and
  a light valve device comprising an array of light valves, wherein the array of light valves is arranged on an optical path of the photo-sensitive surface of the image sensor; and at least one processor configured to:
  divide the array of light valves into groups of neighbouring light valves, each group comprising at least three light valves;
  for a given group of neighbouring light valves,
    control at least one first light valve in the given group, during a given time period, to allow wavelengths lying in one of: a first wavelength range, a first wavelength sub-range to pass through towards a corresponding photo-sensitive cell, the first wavelength sub-range being narrower than and lying within the first wavelength range;
    control at least one second light valve in the given group, during the given time period, to allow wavelengths lying in one of: a second wavelength range, a second wavelength sub-range to pass through towards a corresponding photo-sensitive cell, the second wavelength sub-range being narrower than and lying within the second wavelength range; and
    control at least one third light valve in the given group, during the given time period, to allow wavelengths lying in one of: a third wavelength range, a third wavelength sub-range to pass through towards a corresponding photo-sensitive cell, the third wavelength sub-range being narrower than and lying within the third wavelength range;
  read out image data from the plurality of photo-sensitive cells; and
  process the image data to generate a given image.

9. The imaging system of claim 8, wherein the at least one processor is configured to:

for another group of neighbouring light valves,
  control at least one another first light valve in the another group, during the given time period, to allow wavelengths lying in one of: the first wavelength range, another first wavelength sub-range to pass through towards a corresponding photo-sensitive cell, the another first wavelength sub-range being narrower than and lying within the first wavelength range, and being different from the first wavelength sub-range;

control at least one another second light valve in the another group, during the given time period, to allow wavelengths lying in one of: the second wavelength range, another second wavelength sub-range to pass through towards a corresponding photo-sensitive cell, the another second wavelength sub-range being narrower than and lying within the second wavelength range, and being different from the second wavelength sub-range; and control at least one another third light valve in the another group, during the given time period, to allow wavelengths lying in one of: the third wavelength range, another third wavelength sub-range to pass through towards a corresponding photo-sensitive cell, the another third wavelength sub-range being narrower than and lying within the third wavelength range, and being different from the third wavelength sub-range.

10. The imaging system of claim 8, wherein the at least three light valves of each group comprise at least four light valves, and wherein the at least one processor is configured to:

detect when a given criteria is satisfied, wherein the given criteria is satisfied when at least one of the following is true:
  (i) an average illuminance of a real-world environment is lower than a predefined threshold illuminance;
  (ii) a signal-to-noise ratio of the image data is lower than a predefined threshold value;

when it is detected that the given criteria is satisfied, for the given group of neighbouring light valves, control at least one fourth light valve in the given group, during the given time period, to allow wavelengths lying in the first wavelength range, the second wavelength range and the third wavelength range to pass through towards a corresponding photo-sensitive cell.

11. The imaging system of claim 8, wherein the first wavelength range, the second wavelength range and the third wavelength range correspond to blue, green and red, respectively, and wherein the at least one processor is configured to:

obtain information indicative of a gaze direction of a user;
determine a gaze region in the photo-sensitive surface, based on the gaze direction; and
for at least a predefined percent of groups of neighbouring light valves that correspond to those photo-sensitive cells that lie in the gaze region, control their corresponding first light valves during the given time period to allow wavelengths lying in only one of: the second wavelength range, the third wavelength range, to pass through towards their corresponding photo-sensitive cells.

12. The imaging system of claim 8, wherein the at least one processor is configured to:

detect when at least one image segment of a previous image represents at least one object that is in motion;
when it is detected that at least one image segment of a previous image represents at least one object that is in motion,
  identify a colour of the at least one object from previous image;
  determine a region in the photo-sensitive surface corresponding to the at least one image segment of the previous image; and
  for groups of neighbouring light valves that correspond to those photo-sensitive cells that lie in said region, control their corresponding light valves during the given time period to allow only wavelengths that correspond to the identified colour, to pass through towards their corresponding photo-sensitive cells.

13. A method implemented by an imaging system comprising an image sensor, the image sensor comprising:

a plurality of photo-sensitive cells arranged on a photo-sensitive surface of the image sensor;
a colour filter array arranged on an optical path of the photo-sensitive surface of the image sensor, the colour filter array comprising:
  a first type of colour filters that allow wavelengths lying in a first wavelength range to pass through;
  a second type of colour filters that allow wavelengths lying in a second wavelength range to pass through;
  a third type of colour filters that allow wavelengths lying in a third wavelength range to pass through; and
  a fourth type of colour filters that allow wavelengths lying in the first wavelength range, the second wavelength range and the third wavelength range to pass through; and
a light valve device comprising a grid of light valves, wherein the light valves of said grid are arranged on optical paths of at least the fourth type of colour filters, the method comprising:

for a given colour filter of the fourth type, controlling a corresponding light valve during a given time period to allow wavelengths lying in only one of: the first wavelength range, the second wavelength range, the third wavelength range, to pass through towards the given colour filter of the fourth type, wherein the given colour filter of the fourth type allows said wavelengths to pass therethrough towards a corresponding photo-sensitive cell; and reading out image data from the plurality of photo-sensitive cells; and
processing the image data to generate a given image.

14. The method of claim 13, wherein the light valves of the grid are also arranged on optical paths of the first type of colour filters, the second type of colour filters and the third type of colour filters, the method comprising:

for a given colour filter of the first type, controlling a corresponding light valve during the given time period to allow wavelengths lying in a first valve-based wavelength range to pass through towards the given colour filter of the first type, wherein the given colour filter of the first type allows wavelengths lying in a first wavelength sub-range to pass therethrough towards a corresponding photo-sensitive cell, wherein the first wavelength sub-range corresponds to an overlap between the first valve-based wavelength range and the first wavelength range;

for a given colour filter of the second type, controlling a corresponding light valve during the given time period to allow wavelengths lying in a second valve-based wavelength range to pass through towards the given colour filter of the second type, wherein the given colour filter of the second type allows wavelengths lying in a second wavelength sub-range to pass therethrough towards a corresponding photo-sensitive cell, wherein the second wavelength sub-range corresponds to an overlap between the second valve-based wavelength range and the second wavelength range; and for a given colour filter of the third type, controlling a corresponding light valve during the given time period to allow wavelengths lying in a third valve-based wavelength range to pass through towards the given colour filter of the third type, wherein the given colour filter of the third type allows wavelengths lying in a third wavelength sub-range to pass therethrough towards a corresponding photo-sensitive cell, wherein the third wavelength sub-range corresponds to an overlap between the third valve-based wavelength range and the third wavelength range.

15. A method implemented by an imaging system comprising an image sensor comprising a plurality of photo-sensitive cells, and a light valve device comprising an array of light valves, the method incorporating adjustable colour filter array using the light valve device, the method comprising:
- dividing the array of light valves into groups of neighbouring light valves, each group comprising at least three light valves;
- for a given group of neighbouring light valves,
  - controlling at least one first light valve in the given group, during a given time period, to allow wavelengths lying in one of: a first wavelength range, a first wavelength sub-range to pass through towards a corresponding photo-sensitive cell, the first wavelength sub-range being narrower than and lying within the first wavelength range;
  - controlling at least one second light valve in the given group, during the given time period, to allow wavelengths lying in one of: a second wavelength range, a second wavelength sub-range to pass through towards a corresponding photo-sensitive cell, the second wavelength sub-range being narrower than and lying within the second wavelength range; and
  - controlling at least one third light valve in the given group, during the given time period, to allow wavelengths lying in one of: a third wavelength range, a third wavelength sub-range to pass through towards a corresponding photo-sensitive cell, the third wavelength sub-range being narrower than and lying within the third wavelength range;
- reading out image data from the plurality of photo-sensitive cells; and
- processing the image data to generate a given image.

* * * * *